(12) United States Patent
Berndsen et al.

(10) Patent No.: US 7,541,420 B2
(45) Date of Patent: Jun. 2, 2009

(54) METHOD FOR MAKING MOLDED POLYCARBONATE ARTICLES WITH IMPROVED COLOR

(75) Inventors: Sjef Berndsen, Rilland (NL); Hans Peter Brack, Herrliberg (CH); Bernd Jansen, Bergen Op Zoom (NL); Jan Henk Kamps, Bergen op Zoom (NL); Edward Kung, Bergen op Zoom (NL); Daniel Lowery, Schenectady, NY (US); Patrick Joseph McCloskey, Watervliet, NY (US); Paul Michael Smigelski, Jr., Schenectady, NY (US); Dennis Willemse, Roosendaal (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 114 days.

(21) Appl. No.: 11/688,533

(22) Filed: Mar. 20, 2007

(65) Prior Publication Data

US 2008/0004407 A1    Jan. 3, 2008

Related U.S. Application Data

(60) Provisional application No. 60/806,312, filed on Jun. 30, 2006.

(51) Int. Cl.
*C08G 64/00* (2006.01)
*C08G 63/02* (2006.01)

(52) U.S. Cl. .................. 528/196; 524/115; 524/130; 524/133; 525/394; 525/471; 528/198; 528/425; 548/471; 548/472

(58) Field of Classification Search ............... 525/471, 525/394; 518/196, 198, 425; 524/115, 130, 524/133; 528/196, 198, 425; 548/471, 472
See application file for complete search history.

(56) References Cited

U.S. PATENT DOCUMENTS

| | | |
|---|---|---|
| 4,310,656 A | 1/1982 | Brunelle |
| 4,323,668 A | 4/1982 | Brunelle |
| 5,091,591 A | 2/1992 | Cipullo |
| 5,151,491 A | 9/1992 | Sakashita et al. |
| 5,214,073 A | 5/1993 | Fukawa et al. |
| 5,276,129 A | 1/1994 | Sakashita et al. |
| 5,525,701 A | 6/1996 | Tominari et al. |
| 5,696,222 A | 12/1997 | Kaneko et al. |
| 5,744,526 A | 4/1998 | Goossens et al. |
| 6,177,536 B1 | 1/2001 | Anamizu et al. |
| 6,252,036 B1 | 6/2001 | Hatono et al. |
| 6,300,459 B1 | 10/2001 | Kaneko et al. |
| 6,303,734 B1 | 10/2001 | Funakoshi et al. |
| 6,399,739 B1 | 6/2002 | McCloskey et al. |
| 6,403,754 B1 | 6/2002 | McCloskey et al. |
| 6,410,777 B1 | 6/2002 | Kaneko et al. |
| 6,417,291 B1 | 7/2002 | Kaneko et al. |
| 6,420,512 B1 | 7/2002 | McCloskey et al. |
| 6,420,588 B1 | 7/2002 | McCloskey et al. |
| 6,469,192 B1 | 10/2002 | Burnell et al. |
| 6,500,914 B1 | 12/2002 | Brack et al. |
| 6,506,871 B1 | 1/2003 | Silvi et al. |
| 6,518,391 B1 | 2/2003 | McCloskey et al. |
| 6,525,163 B1 | 2/2003 | Brack et al. |
| 6,548,623 B2 | 4/2003 | Brunelle et al. |
| 6,590,068 B2 | 7/2003 | Brack et al. |
| 6,600,004 B1 | 7/2003 | McCloskey et al. |
| 6,653,434 B2 | 11/2003 | Brack et al. |
| 6,706,846 B2 | 3/2004 | Brack et al. |
| 6,710,156 B2 | 3/2004 | Whitney et al. |
| 6,723,823 B2 | 4/2004 | McCloskey et al. |
| 6,734,277 B2 | 5/2004 | Brack et al. |
| 6,747,119 B2 | 6/2004 | Brack et al. |
| 6,790,929 B2 | 9/2004 | Silvi et al. |
| 6,870,025 B2 | 3/2005 | McCloskey et al. |
| 7,034,099 B2 | 4/2006 | Kamps et al. |
| 2002/0095020 A1* | 7/2002 | Hucks et al. ............. 528/196 |
| 2002/0132957 A1 | 9/2002 | Brack et al. |
| 2003/0013788 A1* | 1/2003 | Mason et al. ............. 524/120 |
| 2003/0139529 A1 | 7/2003 | O'Neil et al. |
| 2003/0149223 A1 | 8/2003 | McCloskey et al. |
| 2004/0068086 A1 | 4/2004 | Day et al. |
| 2004/0087756 A1 | 5/2004 | Ramesh et al. |
| 2004/0138383 A1 | 7/2004 | O'Neil et al. |
| 2005/0192424 A1 | 9/2005 | Shafer et al. |
| 2005/0234211 A1 | 10/2005 | Martinez et al. |
| 2006/0025622 A1 | 2/2006 | Buckley et al. |
| 2006/0069228 A1 | 3/2006 | McCloskey et al. |
| 2006/0116487 A1* | 6/2006 | Brunelle et al. ............. 525/437 |
| 2008/0004418 A1 | 1/2008 | Jansen et al. |

FOREIGN PATENT DOCUMENTS

EP    1577333  A2    9/2005

(Continued)

*Primary Examiner*—Terressa M Boykin
(74) *Attorney, Agent, or Firm*—Larson & Anderson, LLC

(57) ABSTRACT

A method for preparing a molded article includes the steps of (a) obtaining a polycarbonate resin and (b) molding the polycarbonate resin. The polycarbonate resin is made by a transesterification reaction using an activated diaryl carbonate such that the polycarbonate is susceptible to the formation of internal ester linkages (IEL). The method occurs with the proviso that the polycarbonate resin, the molding conditions or both are selected to control the amount of IEL formed during the molding process to a level of less than 0.4 mol %.

26 Claims, 15 Drawing Sheets

FOREIGN PATENT DOCUMENTS

| | | | |
|---|---|---|---|
| EP | 1582549 | * | 10/2005 |
| JP | 5009282 | | 1/1993 |
| JP | 10101786 | | 4/1998 |
| JP | 10101787 | | 4/1998 |
| JP | 11302228 | | 11/1999 |
| JP | 2000129112 | | 5/2000 |
| JP | 2002309015 | | 10/2002 |
| WO | 03040208 | | 5/2003 |
| WO | 03106149 | | 12/2003 |

* cited by examiner

BPA ("uncapped"/free OH)

IEL = 0.833 * [BMSC-trimer] + 0.32

$R^2 = 0.991$

Correlation between % IEL and L color parameter of terpolymers

Correlation between % IEL and a color parameter of terpolymers

Correlation between % IEL and b color parameter of terpolymers

Figure 8 Correlation between % IEL and hydrolytic stability (expressed as percent molecular weight decrease) of terpolymers

METHOD FOR MAKING MOLDED POLYCARBONATE ARTICLES WITH IMPROVED COLOR

CROSS-REFERENCE TO RELATED APPLICATIONS

The present application claims priority to and is a non-provisional application of U.S. provisional application Ser. No. 60/806,312 filed on Jun. 30, 2006 which is herein incorporated for all purposes by reference.

BACKGROUND OF THE INVENTION

This application relates to a method for making molded polycarbonate articles with improved color.

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which a precursor compound such as bisphenol A (BPA) is reacted directly with phosgene or by (2) a melt polymerization process in which a dihydroxy compound such as BPA is transesterified with a diaryl carbonate such as diphenyl carbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain improvements in physical properties relative those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

Color can be generated in polycarbonates or in copolycarbonates which reduces the transparent quality of resulting articles formed from such. The quality of the starting materials has a large effect on the color of the final polycarbonate. Further, the polymerization and molding conditions used to produce the polycarbonate and molded articles may lead to the formation of side reactions within the polycarbonate leading to color formation therein. Greater color formation occurs when the molding conditions are more abusive, and thus to provide the greatest range of manufacturing versatility, methods for controlling color formation during molding are desired.

The present invention relates to a method for improving the color of molded polycarbonate articles that make use of polycarbonate made by melt transesterification with an activated diaryl carbonate, particularly ester-substituted diaryl carbonates such as bismethylsalicylcarbonate (BMSC). Such processes are described in the art, for example in U.S. patent application Ser. Nos. 4,323,668, 5,696,222, 6,300,459, 6,420,512, 6,790,929, 6,870,025 and 7,034,099, all of which are incorporated herein by reference. While manufacture of polycarbonate using activated diaryl carbonates offers many benefits, one downside of the approach is the formation of product with greater color than a comparable product made using diphenyl carbonate.

SUMMARY OF THE INVENTION

When polycarbonates are formed using ester-substituted carbonates such a BMSC, internal linkages that incorporate the ester functionality of the carbonate form to some extent. Applicants have found that these linkages can be formed or increased during molding, and that there is a correlation between the color of a molded article and the presence of these linkages. Thus, the present invention provides a method for preparing a molded article comprising the steps of:

(a) obtaining a polycarbonate resin, said polycarbonate having been made by a transesterification reaction using an activated diaryl carbonate such that the polycarbonate is susceptible to the formation of internal ester linkages (IEL); and (b) molding the polycarbonate resin to form the article, wherein the polycarbonate resin, the molding conditions or both are selected to control the amount of IEL formed during the molding process to a level of less than 0.4 mol %.

In accordance with the present invention, step (b) of this method can be achieved in several ways which may be used individually or in combination. First, the level of IEL in the molded article can be controlled by controlling the amount of IEL present in the starting polycarbonate. Second, the level of IEL in the molded article can be controlled through incorporation of an additive that inhibits formation of IEL during molding.

The present invention also provides a polycarbonate composition having internal ester linkages derived from an activated diaryl carbonate, wherein the internal ester linkages are present in an amount less than 0.4 mol % and the polycarbonate has an L value of greater than 85. The present invention further provides for a molded article made from this polycarbonate composition.

DETAILED DESCRIPTION OF THE INVENTION

The present invention may be understood more readily by reference to the following detailed description of preferred embodiments of the invention and the examples included therein.

Definitions

As used in the specification and claims of this application, the following definitions, should be applied:

"a", "an", and "the" as an antecedent refer to either the singular or plural. For example, "n aromatic dihydroxy compound" refers to either a single species of compound or a mixture of such species unless the context indicates otherwise.

Figure 1A:
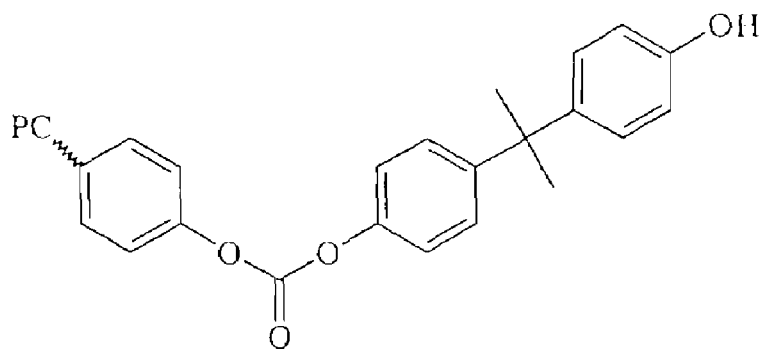
FIG. 1A-I shows various types of end groups that can form when polycarbonate (PC) is formed using bisphenol A and an activated carbonate.
Figure 1B:
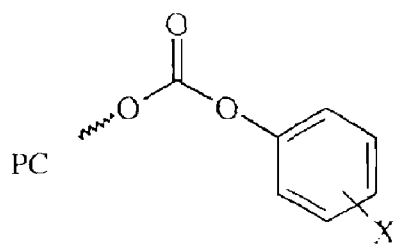
Figure 1C:
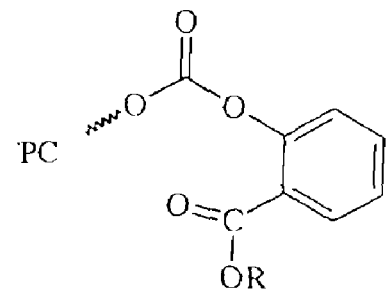
Figure 1D:
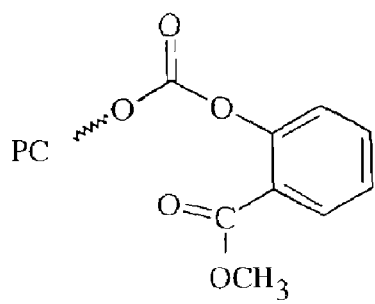
Figure 1E:
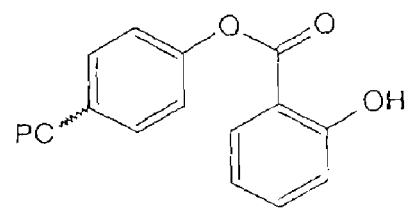
Figure 1F:
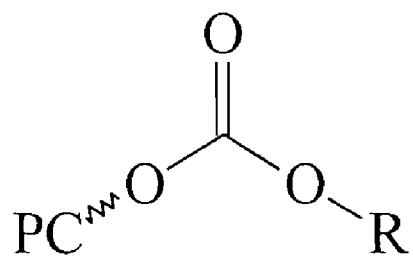
Figure 1G:
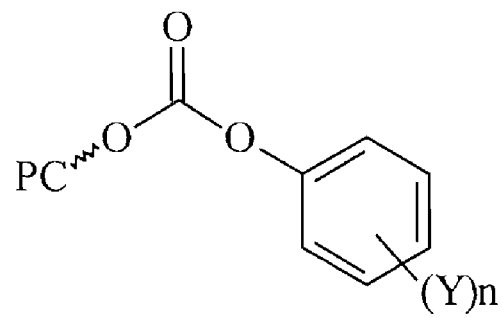
Figure 1J:
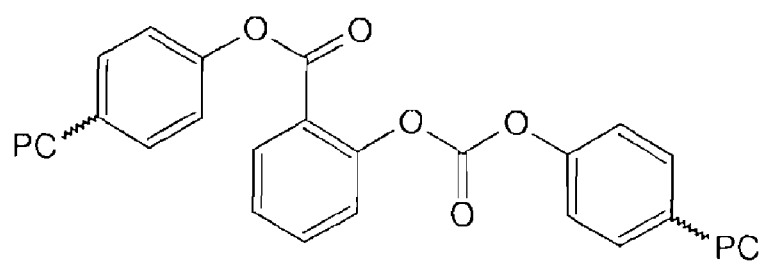
FIG. 1J shows the structure of an internal ester linkage (IEL) which can form when an ester-substituted diaryl carbonate BMSC is used in a reaction with bisphenol A.
Figure 1H:
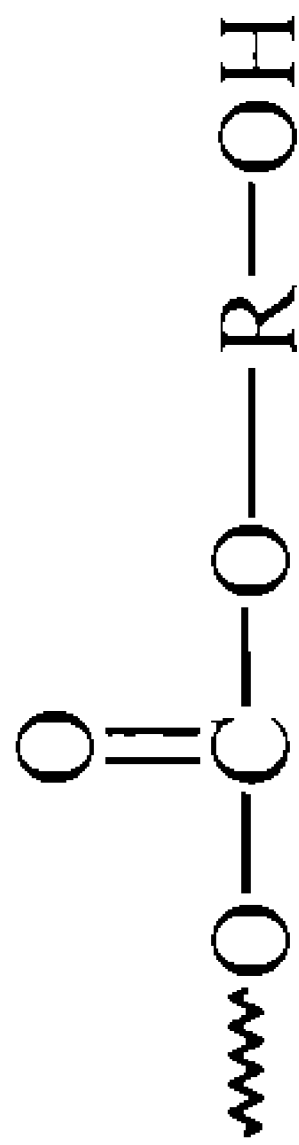
Figure 1I:
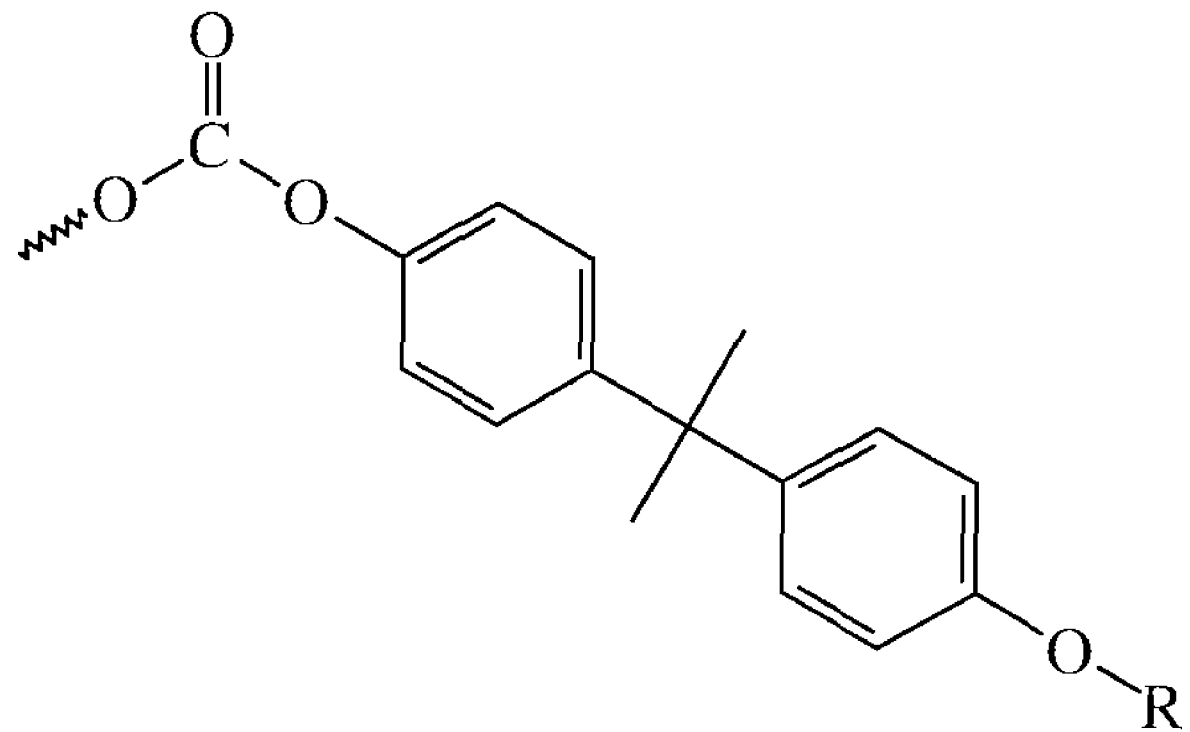

"end groups" refer to the terminal group on the ends of chains in the polycarbonate. FIGS. 1A-1F shows examples of some of the types of different end groups that can form when polycarbonate (PC) is formed using bisphenol A and an activated ester-substituted diaryl carbonyl such as BMSC. FIG. 1A shows a portion of a BPA polycarbonate, with an internal carbonate linkage and a free OH end group. PC represents the balance of the polycarbonate chain. FIG. 1B shows a generalized structure of an activated carbonate end group in which X is one or more electron-withdrawing substituents at the ortho and para positions. FIG. 1C shows the structure of salicyl carbonate end group, where R is an alkyl (for example methyl, ethyl, propyl, butyl or pentyl), phenyl or benzyl group. FIG. 1D shows a methyl salicyl carbonate end group (T-MSC). FIG. 1E shows a salicyl-OH (sal-OH) end group. FIG. 1F shows a non-activated carbonate end groups in which R is defined as in FIG. 1C. For example, such end groups may be formed from the transesterification reaction to incorporate the alcoholic byproduct (e.g. methanol) formed from the hydrolysis or transesterification reaction of the salicyl ester of an activated carbonate (e.g. BMSC or T-MSC). FIG. 1G shows a non-activated end group that can result from the use of chain stoppers such as para-cumyl phenol (PCP). Y is independently hydrogen, alkyl, aryl or aralkyl, and n is an integer between 1 and 5, inclusive. FIG. 1H shows a further form of non-salicylate OH end group. In FIG. 1H, R is optionally substituted linear or branched alkyl, phenyl, aryl or aralkyl. FIG. 1I shows an ether end group, for example, as may be formed by a SN2 reaction of a free OH of a phenolic end group like BPA (FIG. 1A) and the methyl ester functional group on methyl salicylate, BMSC, or terminal methyl salicylate (T-MSC). Such a reaction results from the nucleophilic attack of a phenolic anion on the methyl ester to expel an acidic carboxylic acid leaving group.

In the specification and claims of this application, the mol % of an end-group or type of end-group is expressed as a mole percentage of the dihydroxy compound incorporated in the polymer. There are several ways of measuring this which are discussed below.

"Non-salicylate OH to carbonate end group ratio" as used herein refers to the ratio of the mol % of OH end groups of the type shown in FIGS. 1A and 1H to carbonate-derived end groups of the types shown in any of FIGS. 1B to 1D, and FIGS. 1F to 1H. Note that FIG. 1A shows a BPA end group, but it could also be a residue of a different monomer, as shown in FIG. 1H. In accordance with the invention, this ratio is at least 0.1, for example at least 0.15. In an embodiment of the invention, the ratio is at least 0.2, for example at least 0.3 or 0.4. This ratio distinguishes the product formed using the method of the present invention from that formed when excess activated diaryl carbonate is used. When the reaction goes to completion in the latter case, no appreciable amount of free, non-salicylate OH end groups derived from the dihydroxy compound remains.

As used herein the term "Fries product" or "Fries rearrangement product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A species upon complete hydrolysis of the product polycarbonate.

The terms "Fries reaction" and "Fries rearrangement" are used interchangeably herein.

Figure 3A:
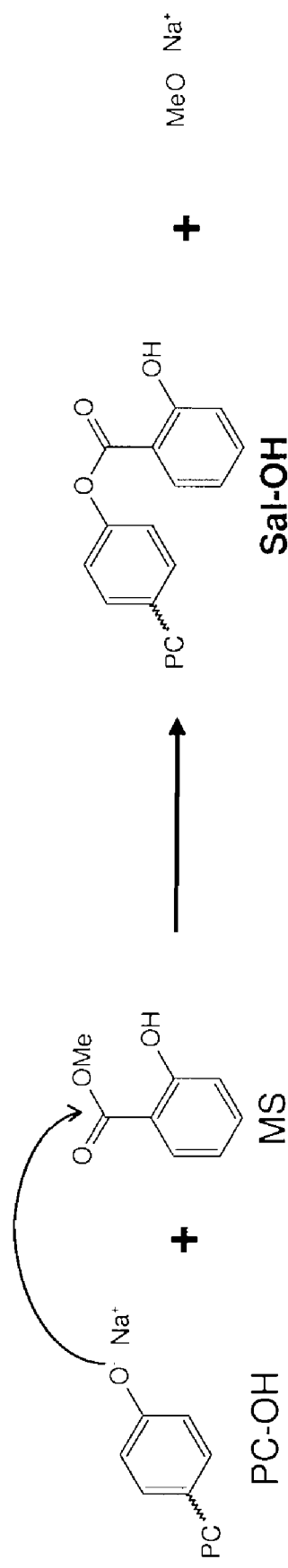
FIGS. 3A-B show side reactions through which by-products such those depicted in FIGS. 1B-F can form.
Figure 3B:
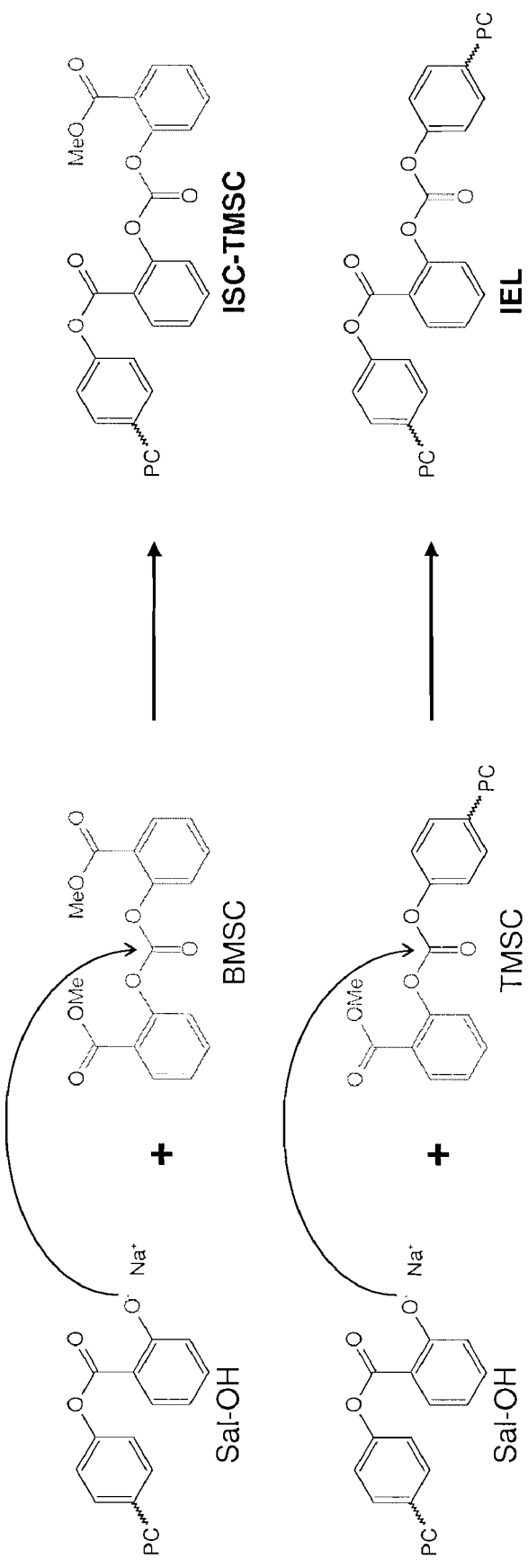

"internal ester linkage" or "IEL" refers to a linkage derived from an ester-substituted diaryl carbonate that is formed internally in place of the normal carbonate linkage. FIG. 1J shows the structure of an internal ester linkage, and FIGS. 3A and 3B show reactions to form such internal ester linkages. The IEL is sometimes referred to as "internal salicyl carbonate" or "ISC".

"molded product" refers to a product that has a defined shape determined by function and/or aesthetics that has been formed in a molding process that involves the application of heat, for example heat in excess of 280° C., and optionally pressure to an unshaped polycarbonate resin. Molding processes include without limitation injection, compression, and injection-compression molding, and blow-molding, including gas-assisted and water-assisted blow molding processes.

"polycarbonate" refers to an oligomer or polymer comprising residues of a dihydroxy compound joined by carbonate linkages. In certain embodiments of the invention, the polycarbonate comprises residues of an aromatic dihydroxy compound and has a number average molecular weight, $M_n$ measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers.

"dihydroxy reaction component" refers to one component of the reaction mixture used in the method of the invention to make polycarbonate. The dihydroxy reaction component comprises one or more dihydroxy compounds. In addition, when the product polycarbonate is a poly(carbonate-co-ester), diacids incorporated in the reaction mixture are part of the dihydroxy reaction component for determining the molar ratio of the reactants.

"carbonate reaction component" refers to a second component of the reaction mixture used in the method of the invention to make polycarbonate. The carbonate reaction component comprises one or more activated diaryl carbonates. In addition, when the product polycarbonate is a poly (carbonate-co-ester), diesters incorporated in the reaction mixture are part of the carbonate reaction component for determining the molar ratio of the reactants.

As used herein, the molar ratio of carbonate reaction component to dihydroxy reaction component refers to the molar ratio based on the amounts of these components as added. As noted below, there are various factors that can cause a specific reaction to depart from the theoretical, including impurities, reduced activity of monomers used in making poly(carbonate-co-esters), and these incidental variations are not taken into account in determining the molar ratio.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

Detection of IEL

Internal ester linkages, as well as the types of end groups present (to the extent relevant to the method of controlling IEL employed) may be detected by spectroscopic techniques. The mol % of an end-group or type of end-group is expressed as a mole percentage of the total amount of dihydroxy compound incorporated in the polymer. There are several ways of measuring this quantity. For example, end groups may be analyzed by either spectroscopic means or by total hydrolysis of a polymer followed by analysis of the various constituent units. Spectroscopic methods include vibrational spectroscopy such as infrared or Raman spectroscopy and nuclear magnetic resonance (NMR) spectroscopy. Such methods and their application to the qualitative and quantitative analysis of polymers are described in more detail in Spectroscopy of Polymers by J. Koenig (ISBN 0-8412-1904-4) and Modern Polymer Spectroscopy by G. Zerbi (ISBN 3527296557), both of which are hereby incorporated by reference.

Of these methods, NMR spectroscopy is the preferred one because it allows an unambiguous structural assignment. It will be understood by one skilled in the art that the NMR resonances in an NMR spectrum may be assigned to specific structural features of a polymer by using one or more methods including: comparison of the observed chemical shifts with those observed for analogous low-molecular weight model compounds, calculation of chemical shifts by using derived additivity relationships (particularly for $^{13}C$ NMR), synthesis of polymers with known specific structural or compositional features to establish the particular resonance-structure relationships, synthesis of polymers with selectively enriched $^{13}C$ sites or having deuterium selectively substituted for protons, comparison of the intensities of structural sequences with those intensities predicted based on models of the polymerization kinetics and statistical distributions, various 1-dimensional (1-D) spectral-editing methods such as the selective-spin-decoupling used for the determination of the proton bonding of carbon atoms, and various two-dimensional (2-D) techniques for determining the coupling between nuclei and to reveal the chemical shifts of the nuclei. The chemical bonding between the various constituent atoms can often be inferred from the $^{1}H$ and $^{13}C$ chemical shifts and from the spin-spin coupling between nuclei. One skilled in the art will understand that each of these techniques has their limitations and that it is often necessary to use a combination of these techniques, as well as other physical and chemical methods as needed.

If the polymer is soluble, high-resolution solution NMR spectra can generally be obtained. Because high polymer solution viscosities may shorten relaxation times and thus broaden line widths, one skilled in the art will understand that various standard methods may be applied to obtain high-resolution NMR spectra, for example, the polymer solution may be diluted or the measurement temperature increased, or a higher magnetic field strength may be applied. On skilled in the art will appreciate that the choice of solvent is important. Preferred solvents will be magnetically isotropic and will be inert and therefore not interact strongly with the polymer (e.g. no hydrogen-bonding interactions between the solvent and the polymer and no degradation of the polymer by the solvent). In addition preferred solvents will not contain functional groups that blank out regions of the NMR spectrum. Preferred solvents will include deuterated chloroform ($CDCl_3$), and the deuterated form of tetrachloroethane. If necessary the deuterated form of other solvents such as dimethyl sulfoxide, benzene, pyridine, acetone, and dioxane may also be used if they do not interact strongly with the polymer or degrade it. In the case of $^{13}C$ NMR spectra, additives such as Chromium (III) acetylacetonate (also known as chromium (III) pentanedionate or Cracac) may be used to reduce both the T1-relaxation times and the Nuclear Overhauser Effect (NOE).

If the polymer is not soluble, various methods well-known in the art may be applied in order to obtain high resolution, narrow linewidths, and enhanced sensitivity in solid-state NMR polymer spectra. For example, one skilled in the art will appreciate that the techniques of high-power decoupling (DD), magic angle spinning (MAS), and cross-polarization (CP) may be applied. One skilled in the art will appreciate that solution NMR methods will be greatly preferred for quantitative analysis whenever possible.

These and all of the other various aspects in obtaining and interpreting NMR spectra of polymers are described in more detail in NMR Spectroscopy of Polymers, Edited by R. N. Ibbett (ISBN 075140005X), NMR Spectra of Polymers and Polymer Additives by A. J. Brandolini and D. D. Hills (ISBN 0824789709), NMR Spectroscopy of Polymers by K. Hatada and T. Kitayama (ISBN 3540402209), and Instrumental Analysis by G. D. Christian and J. E. O'Reilly (ISBN 0-205-08640-3), all of which are hereby incorporated by reference.

In the NMR analysis of end group type and content, both $^{1}H$-NMR and $^{13}C$-NMR may be employed, but $^{1}H$-NMR is preferred because of its greater sensitivity and ease of use for quantitative analysis. When the identity of all of the dihydroxy compound and the composition of the polymer are known and all of the dihydroxy compounds contain at least one proton that is distinct and distinguishable in the proton NMR spectrum from those of the other dihydroxy compounds as well as the various end groups, one may then readily use the integrated resonances of the various end group and dihydroxy units in the $^{1}H$-NMR in order to calculate the molar amount of each end group type present. For example, in the case of the BPA polycarbonate homopolymer, one may simply measure the integrated intensity of each end group type relative to that of the incorporated BPA unit. One skilled in the art will recognize the need for the use of either an internal standard for the quantitative analysis or the use of a chemometric software calibration program. In addition, one skilled in the art will understand that various standard corrections may need to be applied in this analysis, for example, correcting for any differences in the relative number of protons whose intensities have been integrated for each type of structural unit.

| Functional Group | Typical $^{1}H$-NMR assignment (ppm) |
|---|---|
| total Terminal Salicylate | 8.03/8.05(2J=7Hz, doublet, 1 proton) Methylester group at 3.85ppm |
| total Internal Salicylate | 8.20/8.22(2J=7Hz, d, 1H) |
| BPA - Salicyl-OH endgroup | 10.48(CDCl3, OH, s, 1H) 10.38(TCE, OH, s, 1H) 8.03/8.05(2J=7Hz, d, 1H) |
| MeHQ - Salicyl-OH endgroup | 10.33(TCE, OH, d, 1H) 8.03/8.05(2J=7Hz, d, 1H) |
| HQ - Salicyl-OH | 10.36(CDCl3, OH, d, 1H) |

-continued

| Functional Group | Typical $^1$H-NMR assignment (ppm) |
|---|---|
| endgroup | 10.31(TCE, OH, d, 1H) |
| | 8.03/8.05(2J=7Hz, d) |
| RS - Salicyl-OH endgroup | 10.33(CDCle, OH, d, 1H) |
| | 8.03/8.05(2J=7Hz, d, 1H) |
| total Methyl Carbonate | 3.87(CH3O s, 3H) |
| total Methyl Ether | 3.76(CH3O s, 3H) |
| Residual BMSC | 8.01/8.03(2J=7Hz, d) |
| Residual MS | 10.73(OH, s) |
| | 7.80/7.82(2J=7Hz, d) |
| Linear Fries | 8.00(3J=3Hz, d) |
| | 10.42(OH, s) |
| Acid Fries | 7.75(3J=3Hz, d) |
| Branched Fries | 8.13(3J=3Hz, d) |
| PC-OH | 6.63/6.65(2J=7Hz, d) |

When the polymer to be analyzed contains "mer" or monomer repeat units (from incorporated dihydroxy compounds) that do not have distinguishable protons or the copolymer composition is not known, $^{13}$C-NMR may be applied. In this case the content of a particular end group on a mole percent basis may be determined by measuring the integrated area of the resonance for a particular end group type relative to that of the carbon of the carbonate group in the polymer backbone. One skilled in the art will understand that one would measure the amount of the end group relative to take the sum of the carbonate and incorporated diacid units in the case of poly (carbonate-co-ester)s. One skilled in the art will also appreciate that a small correction may need to be made in order to correct for the small difference in number of carbonate and incorporated dihydroxy monomer units in the polycarbonate due to the molar stoichiometry of the monomers and the resulting end group effects. In addition, the NMR method will not always readily distinguish between functional groups in the polymer versus those in some residual species. One skilled in the art will understand that in this case, residual analyses may be conducted and then a correction to the NMR data can be made. Alternatively the polymer may be purified, for example, by precipitation to remove any residual species prior to NMR analysis.

Controlling IEL in a Molded Product

A. Controlling Levels of IEL in the Starting Polycarbonate

A first method for controlling IEL in the starting polycarbonate is disclosed in commonly assigned U.S. patent application Ser. No. 11/427,861, which is incorporated herein by reference. As disclosed therein, polycarbonate is prepared by reacting a dihydroxy reaction component comprising a dihydroxy compound with a carbonate reaction component comprising an ester-substituted carbonate in the presence of an esterification catalyst to produce a polycarbonate, wherein the molar ratio of the carbonate reaction component to the dihydroxy reaction components is less than 1 when expressed to at least three decimal places, for example 0.996 or less. In specific embodiments, the ratio is between 0.962 and 0.996, for example between 0.968 and 0.996. In another specific embodiment, the ratio is between 0.971 and 0.994. This method is carried out at a "reverse ratio" with respect to conventional stoichiometry because the dihydroxy compound is present in a molar excess relative to the ester-substituted diaryl carbonate. The resulting polycarbonate has fewer IEL, and less tendency to form additional IEL upon molding.

A second method for controlling the level of IEL combines the reverse ratio methodology with the addition of an optimized amount of chain stopper. This approach is also described in concurrently filed and commonly assigned U.S. patent application Ser. No. 11/427,885, which is incorporated herein by reference. As disclosed therein, a monohydroxy chain stopper is added during the polymerization. To obtain the reduction in activated carbonate-derived end groups and internal ester linkages noted above, the reaction conditions of time and temperature, and the amount of the chainstopper used are selected to yield a polymer having end groups derived from the monofunctional chainstopper in amounts of from 35 to 65 mol % of the total end groups.

A third method for controlling IEL in the starting polycarbonate is through the use of polycarbonate that is formed using activated diaryl carbonate having low levels of a triester carbonate, for example less than 0.3 mol %, more preferably less than 0.27 mol % and still more preferably less than 0.18 mol %. In a most preferred embodiment, the triester carbonate is present at a level of less than 0.09 mol %. Triester carbonates have the general formula:

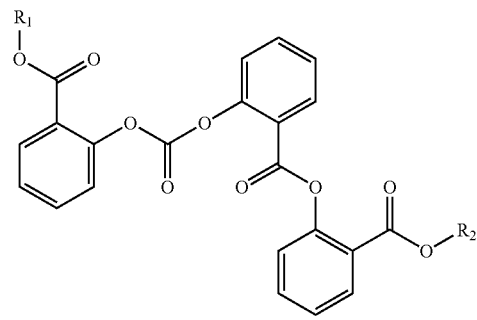

wherein $R_1$ and $R_2$ may be the same or different and are selected from the group consisting of alkyl, phenyl and benzyl. In the case of BMSC, the triester carbonate has the formula:

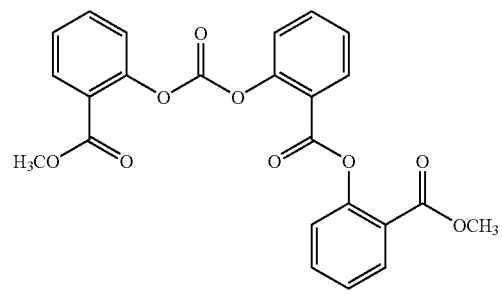

The present inventors have determined that the presence of triester carbonate increases the amount of IEL in polycarbonate, and indeed that over 70% of the BMSC trimer incorporates into polycarbonate chains as IEL. (FIG. 2) Thus, polycarbonate made using BMSC with lower trimer levels has fewer IEL, and less tendency to form additional IEL upon molding.

A method for making BMSC with limited amounts of the triester carbonate is disclosed in commonly assigned US Publication No. 2006-0025622, which is incorporated herein by reference. Briefly, that method comprises the steps of (a) forming a reaction mixture comprising phosgene, an ester-substituted phenol, an organic solvent, and a catalyst selected from the group consisting of a tertiary amine catalyst and a phase transfer catalyst, said reaction mixture having an organic phase and an aqueous phase, wherein said aqueous phase has a brine strength, (b) allowing the reaction mixture to react wherein during the reaction, (i) the aqueous phase has a pH, and the pH is adjusted, if necessary, by the addition of an alkali metal hydroxide solution in amounts such that the pH is greater than or equal to 9.0 during at least some portion of the reaction, and (ii) the brine strength of the aqueous phase is adjusted, if necessary, by varying the concentration of the alkali metal hydroxide solution being added to maintain the pH such that the brine strength is between 15% and a saturated brine solution during at least some portion of the reaction, thereby forming an ester-substituted diaryl carbonate, wherein the reaction mixture is formed with less than 15% water of formulation, and wherein the brine strength is maintained at or above 15% and the pH is maintained at or above 9 for a sufficient portion of the process that the ester-substituted diaryl carbonate is formed with a conversion of at least 90% and a selectivity of at least 98%. For purposes of obtaining BMSC for use in the present invention, a higher selectivity in excess of 99.7% is preferred.

B. Additives that Inhibit IEL Formation During Molding

The amount of IEL formation during molding can also be controlled by addition of additives that limit IEL formation. Commonly assigned U.S. Provisional Application No. 60/806,304 which is incorporated herein by reference discloses a method for reducing color in polycarbonate pellets comprising the steps of:

(a) forming polycarbonate by a melt transesterification method using an activated diaryl carbonate, (b) compounding the polycarbonate with a phosphorus-containing compound that has an abstractable proton or hydrolyzable group, wherein the phosphorous-containing compound is compounded with the polycarbonate in an amount sufficient to result in an improvement in the color properties of the polycarbonate as compared to pellets formed from the same polycarbonate without addition of the phosphorus-containing compound. This method actually brings about a reduction in color, not merely a stabilization such that color does not increase. The mechanism of this reduction does not depend on the level of IEL. However, the addition of the phosphorous-containing compound whether added prior to or during pellet formation, or only just prior to or during molding also inhibits the formation of IEL and color during molding.

The phosphorus-containing compound ("the PCC") used in the present application is one that has at least one abstractable proton or a hydrolyzable group, such as an ester, anhydride, amide or halide. The importance of the PCC having these characteristics is demonstrated in the examples set forth below. In these examples, $H_3PO_3$, $Zn(H_2PO_4)_2$ and $(NH_4)HPO_4$ where the phosphorous has at least one abstractable proton, and distearyl pentaerythritol diphosphite where the phosphorus has a hydrolyzable group are shown to be effective for improving the color of the polycarbonate while non-phosphorous containing acids and phosphorous compounds with no abstractable proton or hydrolyzable group are shown not to be effective.

In accordance with an embodiment of the present invention, a PCC suitable for use with the present invention has the general structure:

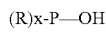

wherein each substituent R is independently selected from the group consisting of (=O); hydrogen; $N(R_1)_4^+$ $^-O$— (wherein $R_1$ is independently H, alkyl, aryl or aralkyl); $M^+$ $^-O$—; $M^{+2}$ $(^-O—)_2$; OH; linear, branched or cyclic $C_1$-$C_{36}$ alkyl or alkoxy; optionally substituted phenyl, aryl, phenoxy, or aryloxy; linear, branched or cyclic alkyl or optionally-substituted aryl or alkaryl phosphate ester or acid; and linear, branched or cyclic alkyl or optionally-substituted aryl or aralkyl phosphite ester or acid;

x is an integer between 1 and 3, wherein at most only one substituent may be (=O);

wherein $M^+$ may be a monovalent metal ion or fragment of a metal ion complex or salt and $M^{+2}$ may be a divalent metal ion or fragment of a metal ion complex or salt, and wherein the sum of all integers x is equal to 3 if the substituent (=O) is present and equal to 2 if the substituent (=O) is absent.

In preferred embodiments, the acidic PCC has the more specific structure of either of structures I to II described herein. In one embodiment the PCC will have structure I:

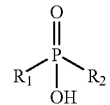

wherein $R_1$ and $R_2$ are independently hydrogen; O—$(NH_4)$+; OH; linear, branched or cyclic $C_1$-$C_{36}$ alkyl or alkoxy; optionally substituted phenyl, aryl, phenoxy, or aryloxy.

In another preferred embodiment the acidic PCC will have structure II:

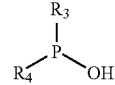

wherein $R_3$ and $R_4$ are independently hydrogen; O—$(NH_4)$+; OH; linear, branched or cyclic $C_1$-$C_{36}$ alkyl or alkoxy; optionally substituted phenyl, aryl, phenoxy, or aryloxy.

A non-limiting list of preferred PCCs having structure I or II that are suitable for use with the present invention are: dimethyl phosphinic acid (CAS # 3283-12-3), dibutylphosphinic acid, diphenyl phosphinic acid (CAS #1707-03-5), 2-methylphenyl (phenyl) phosphinic acid, 3,5-dimethylphenyl (phenyl) phosphinic acid (CAS # 96331-30-5), 3-methoxyphenyl(phenyl)phosphinic acid (CAS # 4552-91-4), 4-methoxyphenyl(phenyl)phosphinic acid (CAS # 13118-95-1), 1-methylheptyl(phenyl)phosphinic acid (CAS # 64308-50-5), 4-ethoxyphenyl(phenyl)phosphinic acid (CAS # 96329-70-3), bis(4-methoxyphenyl)phosphinic acid (CAS #20434-05-3), dioctylphosphinic acid, bis(2,4,4-trimethylpentyl)phosphinic acid (CAS # 27661-42-3), diammonium hydrogen phosphate, diphenyl phosphate, diphenyl phosphite, 4-(tert-pentyl)phenyl phosphate, (R)-(-)- 1,1'-binaphthalene-2,2'-diyl hydrogen phosphate (CAS # 39648-67-4), and di(2-ethylhexyl) phosphate, mono-zinc phosphate $Zn(H_2PO_4)_2$, phosphoric acid and phosphorous acid.

Without intending to be bound by any particular mechanism, the inventors believe that the acidic functionality of the PCC may be quite important in its color-improving function. One skilled in the art will understand that it may not be readily possible to use acidic additives in all additive feeding, mixing, reacting, and extruding systems due to insufficient corrosion resistance of the construction materials of the system depending on the acidity of the PCC and its residence time and temperature in the system components and also the choice of optional solvent systems for the PCC. The occurrence of such corrosion processes may actually act to degrade the color of the polycarbonate rather than to improve it. For this reason, it may be desirable to use a PCC having a hydrolyzable group such as a phosphorus ester, anhydride, amide, or halide. In one embodiment it is a phosphorus ester. The choice of the PCC and its hydrolyzable group will depend on the residence time and temperature and other conditions such as the use of an optional solvent for the color improvement process. It is believed that the hydrolyzable group should ideally undergo significant hydrolysis to yield appreciable quantities of an active acidic species for sufficient time in the color improvement process.

Thus, in another embodiment the PCC may be non-sterically-hindered and hydrolyzable phosphite or phosphate esters, amides, anhydrides. Without being bound by a mode of operation, it is believed that non-sterically hindered and hydrolyzable phosphite and phosphate esters and the like readily hydrolyze to form acidic species under molding conditions and pellet forming conditions at the high temperatures. In preferred embodiments these esters have no branching near the ester group (O or ORI) so that there is little to no inhibition of the hydrolysis/degradation of this ester under molding or pellet forming conditions.

In general these non-sterically-hindered and hydrolyzable phosphite or phosphate esters will have the general structure:

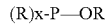

wherein each substituent R is independently selected from the group consisting of (=O); hydrogen; $N(R_1)_4^+$ $^-O—$; $M^+$ $–O—$; $M^{+2}(^-O—)_2$; OH; linear or cyclic $C_1$-$C_{36}$ alkyl or alkoxy; optionally non-ortho-substituted phenyl, aryl, phenoxy, or aryloxy; linear, branched or cyclic alkyl or optionally-substituted aryl or alkaryl phosphate ester or acid; and linear, branched or cyclic alkyl or optionally-substituted aryl or aralkyl phosphite ester or acid;

x is an integer between 1 and 3, wherein at most only one substituent may be (=O);

wherein $M^+$ may be a monovalent metal ion or fragment of a metal ion complex or salt and $M^{+2}$ may be a divalent metal ion or fragment of a metal ion complex or salt, and wherein the sum of all integers x is equal to 3 if the substituent (=O) is present and equal to 2 if the substituent (=O) is absent.

The $R_1$ group can be a linear, branched or cyclic $C_1$-$C_{36}$ alkyl, optionally non-ortho-substituted phenyl, aryl, aralkyl. If the alkyl is branched, the branch point should be located at least 2 carbons away from the oxygen, preferably 3 or more, most preferably 4 or more. Any branch lengths should be less than x–1 carbons long, where x is the number of carbons between the branch point and the oxygen. Preferably any branches will be short and comprise not more than 1-3 carbon atoms.

In preferred embodiments, these non-sterically hindered ester PCCs have the more specific structure of either of structures III to IV described below.

In one embodiment, the non-sterically hindered ester PCC has the more specific structure III:

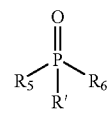

III wherein R' is an alkoxyl, phenoxy, aryloxy or aralkyloxy, $NR_x$ (where $R_x$ is H, alkyl, aryl or aralkyl), $OC(=O)R_x$ or $OP(=O)R_x$, and $R_5$ and $R_6$ are independently hydrogen, hydroxy; linear or cyclic $C_1$-$C_{36}$ alkyl or alkoxy; phenyl, aryl, phenoxy, aryloxy phosphate ester or acid, or phosphite ester or acid.

In another embodiment the non-sterically hindered ester PCC has the more specific structure IV:

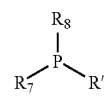

IV wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; linear or cyclic $C_1$-$C_{36}$ alkyl or alkoxy; phenyl, aryl, phenoxy, aryloxy, phosphate ester or acid, or phosphite ester or acid.

A non-limiting list of PCCs having structure III or IV that are suitable for use with the present invention are: distearyl pentaerythritol diphosphite, n-butyl diphenylphosphinite (CAS #13360-94-6), 2-phenylethyl diphenylphosphinate, 1-naphthyl diphenylphosphinate, methyl diphenylphosphinite (CAS #4020-99-9), ethyl diphenylphosphinite (CAS #719-80-2), n-butyl diphenylphosphinite (CAS #13360-94-6), methylcyclohexyl diphenylphosphinate, triphenyl phosphite, diisodecyl phenyl phosphite, tri-para-tolyl phosphate, tri-n-propyl phosphate (CAS #513-02-0), methyl diphenyl phosphate (CAS #115-89-9), tri-n-butyl phosphate (CAS #126-73-8), triphenyl phosphate (CAS #115-86-6), cyclohexyl diphenyl phosphate (CAS #4281-67-8), bis(3,5-dimethylphenyl) 4-ethylphenyl phosphate (CAS #7144-07-2), tris(3,4-dimethylphenyl) phosphate (CAS #3862-11-1), tris (4-tert-butylphenyl)phosphate (CAS #78-33-1), trans-1,4-cyclohexanediol bis(diphenyl phosphate), trisnonylphenyl phosphate, triisodecyl phosphite, tris(tridecyl)phosphate, and trilauryl phosphite.

In further specific embodiments the PCC will have two or more phosphorus atoms within the molecule. For example a particularly preferred PCC that has structure IV is distearyl pentaerythritol diphosphite (for example WESTON® 618) a compound having the structure:

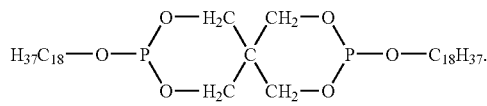

C. Selection of Molding Conditions

The amount of IEL that is formed can be controlled through the selection of molding conditions. As illustrated below in Example 3, increasing severity or abusiveness of molding conditions results in increased formation of IEL and increased color from the same materials. Thus, one approach to controlling IEL, which can be used in combination with the other approaches, is to select the mildest conditions that will meet the needs of the polymer and product desired.

Correlation of IEL and Color of Molded Product

The correlation of IEL and molded color is difficult to observe because of the number of variables involved. Different polymer materials, and different quality of starting materials result in different color properties in the final product. Nevertheless, a clear correlation of IEL and the color of the molded product can be observed when conditions are maintained in order to obtain parallel results.

Table 1 shows results for molded color in compositions made from polycarbonate prepared using either the reverse ratio method or the reverse ratio method with optimized chain stopper as described above for both homopolymer (HP) and terpolymer (TP) polycarbonates. As shown, the color of the molded polycarbonate, particularly as reflected in the b parameter, is superior when the IEL levels in the initial pellets and molded articles is lower. Also, when the initial IEL level is lower, the increase in IEL upon molding is less.

TABLE 1

| | | | IEL | | Color Molded | | |
|---|---|---|---|---|---|---|---|
| Example | Polymer | Method | Pellets | Molded | L | a | b |
| WE1 | HP | Reverse ratio | 0.12 | 0.11 | 95.5 | −0.1 | 1.6 |
| WE2 | HP | Rev Ratio- PCP chain stopper 50 mol % end groups | 0.15 | 0.16 | 95.4 | −0.1 | 2.0 |
| WE3 | TP | reverse ratio | 0.15 | 0.15 | 91.0 | 1.0 | 7.9 |
| WE4 | TP | Rev ratio -PCP chain stopper 50 mol % end groups | 0.23 | 0.17 | 91.1 | 0.9 | 9.1 |
| CE1 | HP | normal ratio | 0.50 | 0.75 | 95.2 | −0.3 | 2.6 |
| CE2 | TP | normal ratio | 0.63 | 1.03 | 90.2 | 1.6 | 9.9 |

Additional evidence of the correlation of color with IEL is found in the examples set forth below. The invention will now be further explained with reference to the following, non-limiting examples.

EXAMPLE 1

A. The Following Materials were Used in the BPA Polymer Reaction in Subsection (B.) of This Example:

25 mass % TMAH solution: Sachem Inc, Part Code 322
0.5 mol/l NaOH, Acros, J/7630C/05.
BMSC, purity 99.87%, Trimer impurity: 0.08

The polymerization of polycarbonate was carried out in the reactor system consisting of 2 identical reactors which have the same vacuum system. The oligomerization vessels were each charged at ambient temperature and pressure with ~13.1645 grams of the solid diol monomer, BPA and ~20.0000 grams of the solid BMSC using a ratio of ~1.050 (BMSC:BPA). After this the reactor was sealed shut. The system was deoxygenated by briefly evacuating the oligomerization reactor and then introducing nitrogen. This process was repeated three times. The catalysts tetramethyl ammonium hydroxide and sodium hydroxide were next added as an aqueous solution, using respectively $25 \times 10^{-5}$ mol TMAH/mol BPA and $2 \times 10^{-6}$ mol NaOH/mol BPA using the profile shown in Table 2A.

TABLE 2A

Reaction profile for Melt Polymerization Unit

| Time | Remarks |
|---|---|
| — | Set Temperature of Reactors at 170° C. |
| — | Set Temperature of Overhead at 100° C. |
| — | Set Pressure at 1000 mbar |
| 0:00:00 | All settings reached |
| 0:06:00 | Start agitators for Reactors |
| 0:15:00 | Set Pressure at 500 mbar |
| 0:45:00 | Set Temperature of Reactors at 270° C. |
| 0:50:00 | Set Temperature of Reactors at 300° C. |
| 0:50:00 | Set Pressure at 0 mbar |
| 0:54:00 | Stop reaction by releasing vacuum |
| 1:04:00 | remove polymer and stop system |

The Melt-polymerization unit is equipped with a high vacuum system to remove all methyl salicylate formed as a byproduct in the polymerization reaction.

B. Spiking the Trimer Impurity on a Batch BPA-homopolymer Reaction.

Figure 2:
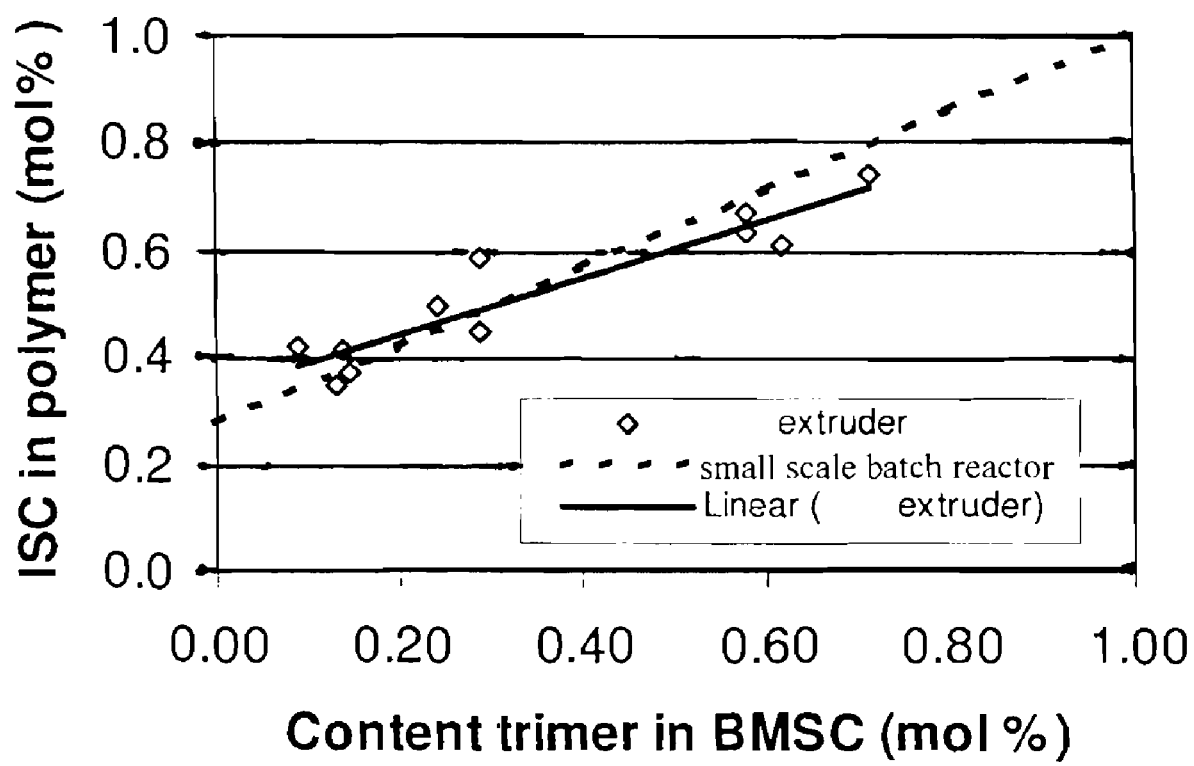
FIG. 2 shows relationship between formation of internal ester linkages (IEL) in polycarbonate and the percent trimer (triester carbonate) in BMSC. This trimer species comprises three incorporated aromatic units resulting from incorporation or reaction of three methyl salicylate molecules.

The BMSC-Trimer was spiked at levels of 0.6 mol % and 3.0 mol % relative to and in place of BMSC. The runs were done in duplicate and run independently on different reactors. The produced polymers showed an increase of IEL correlating with the increase of added trimer (FIG. 2). It should be noted that the control experiment (0% added BMSC-trimer) actually contains about 0.08 mol % BMSC-trimer due to the impurity present in the BMSC monomer used. From the results it was calculated that roughly 70% of the BMSC-Trimer was converted into IEL.

C. Spiking the Trimer Impurity on an Extruder BPA-homopolymer Reaction.

Similar results were obtained on a small scale extruder line, indicating that the formation of IEL from the triester carbonate is not an artifact of the batch reactor. In the extruder experiments BMSC samples containing different amounts of BMSC-Trimer were used to prepare BPA homopolymers in various runs on a reactive extruder line comprising a batch oligomerization tank and a reactive extruder. The Salicyl-OH content of the oligomer samples from the batch oligomerization tank and the IEL content of the resulting polymer were measured and are shown in Table 2B.

TABLE 2B

| BMSC Trimer (mole %) | Salicyl-OH in Oligomer (ppm) | IEL in Polymer (mole %) |
|---|---|---|
| 0.09 | 111 | 0.42 |
| 0.13 | 100 | 0.35 |
| 0.14 | 122 | 0.41 |
| 0.15 | 116 | 0.37 |
| 0.24 | 177 | 0.50 |
| 0.29 | 149 | 0.45 |
| 0.29 | 151 | 0.59 |
| 0.58 | 248 | 0.63 |
| 0.58 | 252 | 0.67 |
| 0.62 | 237 | 0.61 |

Figure 10:
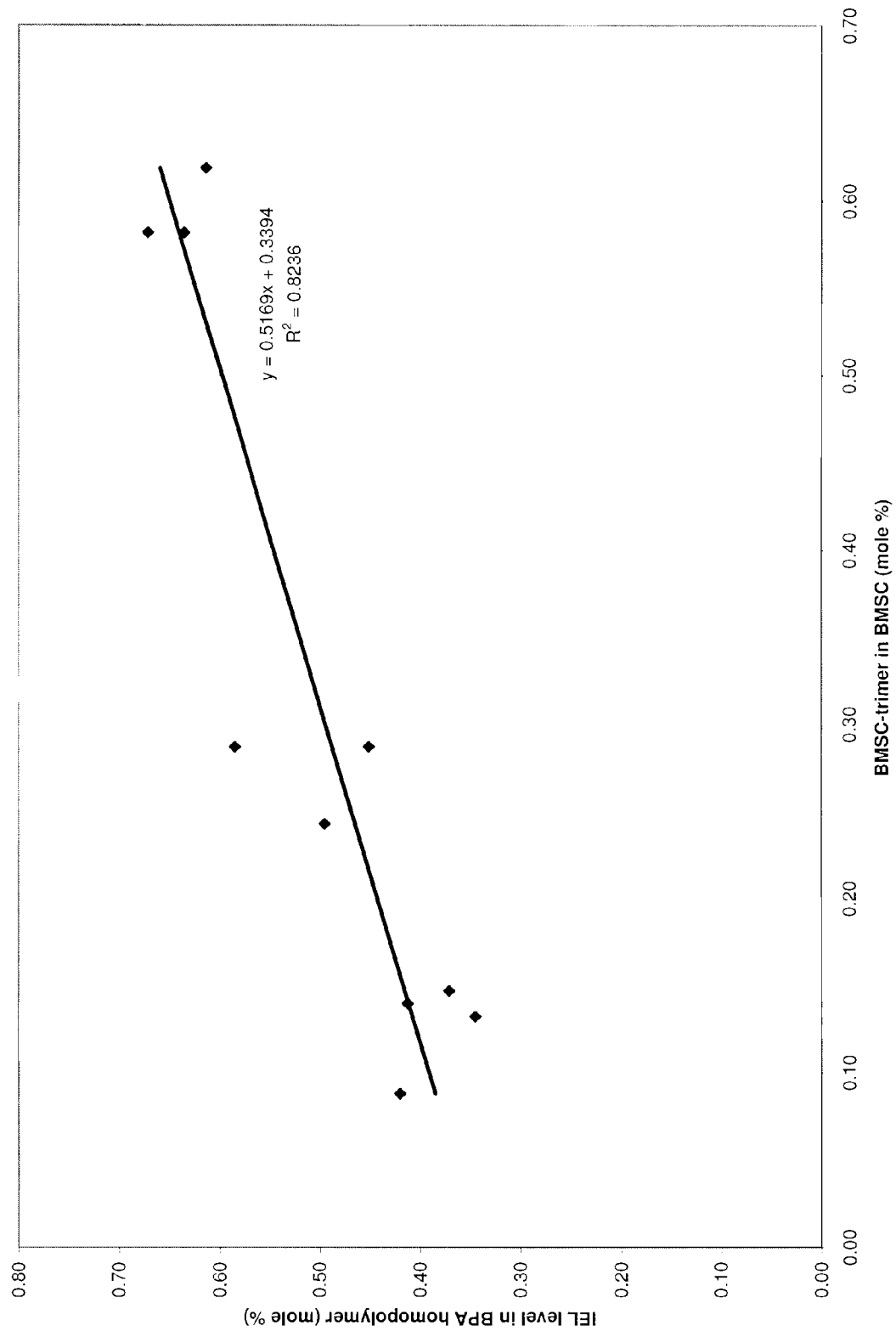
Figure 11:
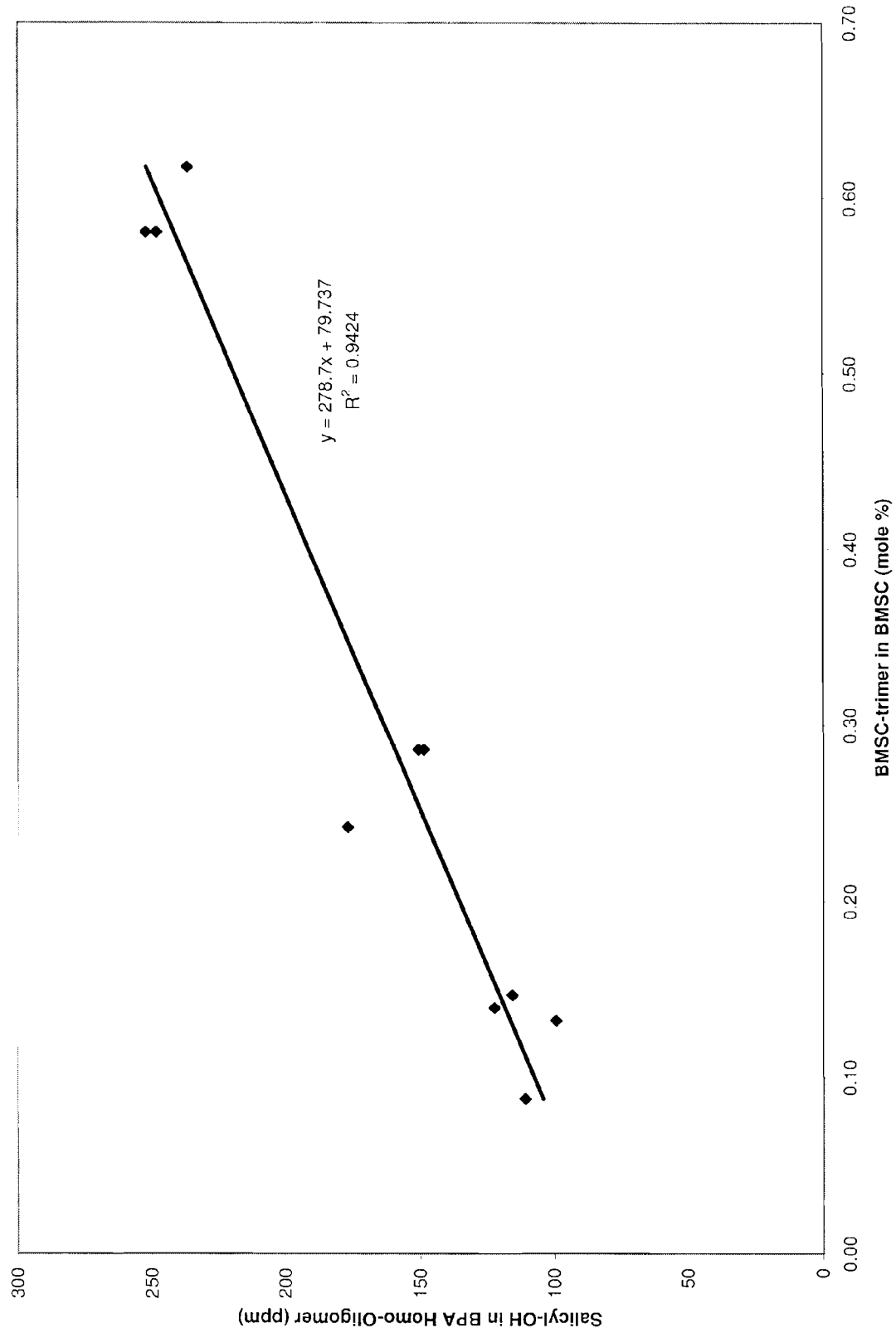

The data in Table 2B is graphically depicted in FIGS. 10 and 11 and indicates that elevated levels of BMSC-Trimer in BMSC lead to elevated levels of Salicyl-OH in the oligomer and elevated levels of IEL in the resulting polymer. Some of the BMSC-trimer may be incorporated directly to give IEL, and some of it is incorporated first to give Sal-OH end groups which may then react further with BMSC or a T-MSC end group to give an IEL in the resulting polymer.

EXAMPLE 2

A. The Following Materials were Used in This Example:

Terpolymer polycarbonate pellets were formed by reaction of BPA, hydroquinone and methyl hydroquinone monomers with BMSC. The terpolymer of this example (TP-A) had a Mw of 29770 daltons, 92 ppm of residual methyl salicylate and an IEL level of 0.51 mol %. For molding with different phosphorus containing additives, the terpolymer (TP-A) polycarbonate pellets were dried before molding for 3 hours at 105° C. Molding was done using an Engel 45 T molding machine under a severe set of molding conditions as follows:

| Molding Machine: Engel 45T | | |
|---|---|---|
| Condition | UOM | D |
| T Hopper | ° C. | 40 |
| T Zone 1 | ° C. | 320 |
| T Zone 2 | ° C. | 330 |
| T Zone 3 | ° C. | 340 |
| T Nozzle | ° C. | 335 |
| T Mold | ° C. | 100 |
| Hold time | sec | 10 |
| Cool time | sec | 128 |
| Cycle time | sec | 144 |
| Res. Time | sec | 720 |

The color of molded 2.5 mm thick TP plaques was measured in the transmission mode using a Gretag-MacBeth 7000A spectrometer according to the CIE laboratory standard. A D65 light source was used with a 10° observation angle. The color properties and the IEL levels of the molded plaques were measured. The results are summarized in Table 3.

TABLE 3

| Example | Additive | Molded Color | | | IEL mol % |
|---|---|---|---|---|---|
| | | L | a | b | |
| before molding | | 81.3 | 4.1 | 15.4 | 0.51 |
| CE3 | none | 87.8 | 2.27 | 13.69 | 0.80 |
| WE5 | $H_3PO_3$ (15 ppm) | 94.3 | 0.25 | 3.12 | 0.33 |
| WE6 | $H_3PO_3$ (9 ppm) | 90.7 | 1.22 | 8.93 | 0.49 |
| WE7 | $H_3PO_3$ (2 ppm) | 86.8 | 2.13 | 16.41 | 0.71 |
| WE8 | $(NH_4)_2HPO_4$ (25 ppm) | 94.1 | 0.38 | 3.47 | 0.37 |
| WE9 | $(NH_4)_2HPO_4$ (14 ppm) | 93.5 | 0.50 | 4.66 | 0.39 |
| WE10 | $(NH_4)_2HPO_4$ (3 ppm) | 87.4 | 1.84 | 15.5 | 0.69 |

As shown, there is a concentration dependent decrease in the amount of IEL formed on molding for both of the phosphorous-containing additives tested. Moreover, in examples with higher levels of additive, where the resulting IEL level is lower than about 0.40 mol %, particularly good color properties that are better than the color properties of CE3 molded without additive are exhibited.

A second terpolymer (TP-B) was prepared and had a Mw of 30417 daltons, 103 ppm of residual methyl salicylate and an IEL level of 0.57 mol %. For additional comparison, a non phosphorous quencher, butyl tosylate (BT) was also tested. In addition, commercial antioxidants were added as indicated in Table 4. The color properties and the IEL levels of the molded plaques were measured. The results are summarized in Table 4.

TABLE 4

| Example | Additive/ antioxidant | Molded Color | | | IEL mol % |
|---|---|---|---|---|---|
| | | L | a | b | |
| before molding | | 82.3 | 3.0 | 16.6 | 0.57 |
| CE4 | none | 89.4 | 1.2 | 12.4 | 0.83 |
| CE5 | BT (10.8 ppm)/ Irgafos (550 ppm) | 92.7 | 0.26 | 6.8 | 0.69 |
| CE6 | BT (24.3 ppm)/ Irgafos (100 ppm) | 92.7 | 0.39 | 6.5 | 0.70 |
| CE7 | BT (39.7 ppm)/ P-EPQ | 94.3 | −0.24 | 5.2 | 0.65 |
| WE11 | BT 1910.9 ppm)/ Weston (300 ppm) | 95.1 | −0.13 | 2.5 | 0.49 |
| WE12 | $H_3PO_3$ (4.1 ppm)/ Weston (300 ppm) | 94.9 | −0.12 | 2.6 | 0.49 |

Comparative Examples 4 to 7 and Working Examples 11 and 12 demonstrate that there is a decrease in the amount of IEL formed on molding for the phosphorous-containing additives tested and no decrease in IEL for the non-phosphorus containing additives. It is believed that Weston serves the function as both an antioxidant and a phosphorous-containing compound in accordance with the invention.

EXAMPLE 3

A. The Following Materials were Used in This Example:

Three batches of polycarbonate homopolymer were prepared by the reaction of BPA and BMSC, and formed into pellets having the properties shown in Table 5.

TABLE 5

| | | BPA Homopolymers | | |
|---|---|---|---|---|
| Material | | C | D | E |
| Mw | Dalton | 32264 | 30789 | 24730 |
| MS | ppm | 720 | 238 | 866 |
| I-SC | Mol % | 0.28 | 0.21 | 0.72 |
| Color | l | 89.3 | 91.6 | 87.3 |
| | a | 0.2 | −0.7 | 3.3 |
| | b | 8.6 | 7.5 | 11.2 |

These polymer pellets were molded in an Engel 45T molding machine under mild (condition A) or abusive (condition D) molding conditions as set forth in Table 6.

TABLE 6

| | Molding Machine: Engel 45T | | |
|---|---|---|---|
| Condition | UOM | A | D |
| T Hopper | ° C. | 40 | 40 |
| T Zone 1 | ° C. | 280 | 320 |
| T Zone 2 | ° C. | 290 | 330 |
| T Zone 3 | ° C. | 300 | 340 |
| T Nozzle | ° C. | 295 | 335 |
| T Mold | ° C. | 90 | 100 |
| Hold time | sec | 10 | 10 |
| Cool time | sec | 20 | 128 |
| Cycle time | sec | 36 | 144 |
| Res. Time | sec | 180 | 720 |

The molded plaques compositions were then tested for IEL levels and color properties, and the results are shown in Table 7.

TABLE 7

| | | | Color Properties | | |
|---|---|---|---|---|---|
| Polycarbonate | Molding Condition | IEL (mol %) | L | a | b |
| C | A | 0.28 | 95.49 | −0.08 | 1.48 |
| C | D | 0.69 | 95.35 | −0.22 | 2.13 |
| D | A | 0.20 | 95.76 | −0.13 | 1.23 |
| D | D | 0.46 | 95.52 | −0.33 | 2.13 |
| E | A | 0.69 | 95.3 | 0.10 | 1.96 |
| E | D | 0.80 | 95.14 | −0.18 | 2.66 |

As shown for each material, use of more abusive molding conditions led to increases in IEL level and decrease in color quality.

EXAMPLE 4

In Example 4 it is demonstrated that BMSC-Trimer present in the activated carbonate source (BMSC source) correlates to the amount of IEL in the resulting PC.

A. The Following Materials were Used in the Following Examples.

25 mass % tetramethyl ammonium hydroxide (TMAH) solution,
0.5 mol/l sodium hydroxide (NaOH),
Bismethylsalicylcarbonate (BMSC), purity 99.87%,
BMSC-trimer, purity 99.02 (impurity: 0.08)
Bisphenol A (BPA):
Methyl Hydroquinone (MeHQ):
Hydroquinone (HQ):

B. Laboratory-Scale Terpolymer Polymerization Reactions

Melt polymerizations (using BMSC) were carried out in a reactor system having 2 identical vacuum reactor systems operated in parallel. In this system the two reactors were each charged at ambient temperature and pressure with the solid diol monomers and the solid BMSC. After this the reactors were sealed shut. The total system was deoxygenated by briefly evacuating the two reactors and then introducing nitrogen. This process was repeated three times. The catalysts tetramethyl ammonium hydroxide and sodium hydroxide were next added as an aqueous solution, using concentrations of respectively of $25 \times 10^{-5}$ mol TMAH/mol diol and $2 \times 10^{-6}$ mol NaOH/mol diol. The reaction was carried out at a stoichiometric ratio of 1.05 ([carbonate]/[diol]=1.05) according to the specific profile shown in Table 8.

TABLE 8

| | Reaction profile for Melt Polymerization |
|---|---|
| Time | Remarks |
| — | Set Temperature of Reactor R501 & R601 at 170° C. |
| — | Set Temperature of Overhead TI501 & TI601 at 100° C. |
| — | Set Pressure at 1000 mbar |
| 0:00:00 | All settings reached |
| 0:06:00 | Start agitators for Reactor R501 & R601 |
| 0:15:00 | Set Pressure at 500 mbar |
| 0:45:00 | Set Temperature of Reactor R501 & R601 at 270° C. |
| 0:50:00 | Set Temperature of Reactor R501 & R601 at 270° C. |
| 0:50:00 | Set Pressure at 0 mbar |
| 0:54:00 | Open HV001 |
| 1:04:00 | Stop system and remove polymer product |

C. Spiking the BMSC-trimer Impurity in a HQ/BPA/MeHQ-Terpolymer Polymerization Reaction The BMSC-trimer was spiked at levels of 0 mol % (example 1) and 0.6, 1.8, and 3.0 mol % (examples 2 to 4, respectively) relative to the total carbonate (BMSC) content and in place of some of the BMSC monomer. The tests listed in Table 9 were performed. Note the term "<LOD" means that the measurement was below the level of detection.

TABLE 9

| Spiking of BMSC-trimer in terpolymerizations and 1H-NMR analysis | | | | | | | |
|---|---|---|---|---|---|---|---|
| NMR Name | BMSC-trimer (mol %) | Sal-OH ppm | TMSC mol % | I-SC mol % | Me-Carb mol % | Me-Eth mol % | BPA-OH Ppm |
| Example 1 | 0.0 | <LOD | 4 | 0.22 | 1 | <LOQ | <LOD |
| Example 2 | 0.6 | <LOD | 5.73 | 0.89 | 0.34 | 0.057 | <LOD |

TABLE 9-continued

Spiking of BMSC-trimer in terpolymerizations and 1H-NMR analysis

| NMR Name | BMSC-trimer (mol %) | Sal-OH ppm | TMSC mol % | I-SC mol % | Me-Carb mol % | Me-Eth mol % | BPA-OH Ppm |
|---|---|---|---|---|---|---|---|
| Example 3 | 1.8 | <LOD | 5.73 | 1.93 | <LOD | 0.079 | <LOD |
| Example 4 | 3.0 | 13 | 4 | 2.74 | <LOD | <LOD | <LOD |

Figure 4:
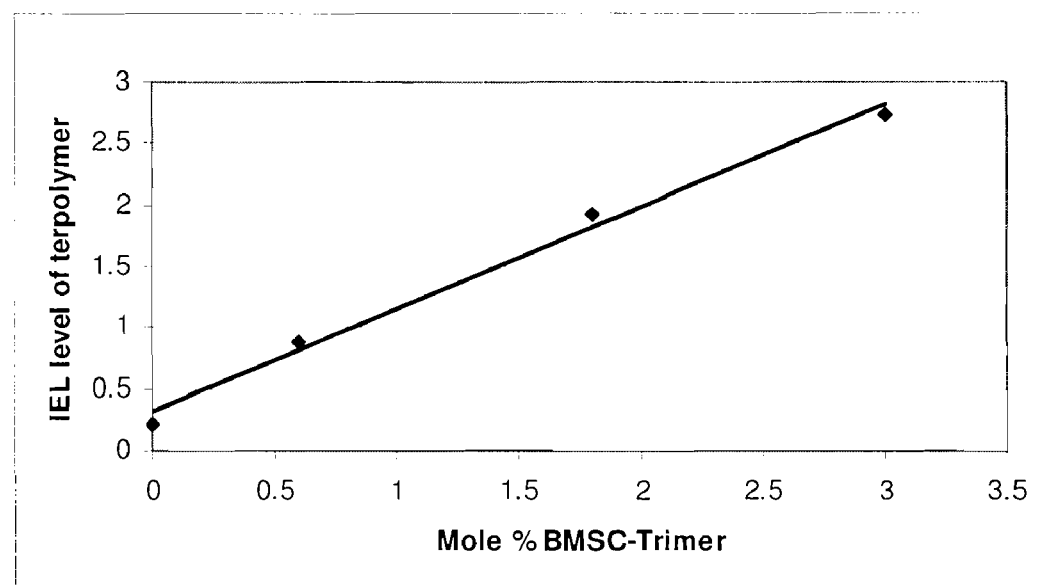
FIGS. 4 to 8, 10 and 11 show results from the example section.

The produced terpolymer that was spiked with BMSC-trimer showed an increase of IEL (listed as I-SC in table 9) correlating with the increase of added BMSC-trimer (see FIG. 4). It should be noted that the example 1 (0% added BMSC-trimer) actually contains about 0.08 mol % BMSC-trimer due to the impurity present in the BMSC monomer used. From the results it was calculated that roughly 80% of the BMSC-trimer was incorporated in the form of the internal ester linkage.

C. Discussion/Conclusion

These model laboratory experimental examples demonstrate the quantitative correlation between the BMSC-trimer content of the carbonate monomer and the IEL content of the melt terpolymer produced. The melt terpolymer in the baseline case (no added additional BMSC-trimer) contained about 0.22 mol % IEL. When different mol % levels of BMSC-trimer was spiked to a terpolymer reaction it could be seen that the final IEL content in the terpolymer end product increased significantly (see FIG. 4 and Table 9) and about 80 mol % of the spiked BMSC-trimer amount is converted to IEL.

EXAMPLE 5

Example 5 demonstrates, inter alia, that varying the amount of IEL is correlated to color in polycarbonate. Furthermore, Example 5 demonstrates that molding polycarbonate under abusive conditions increases the IEL in the polycarbonate and that a phosphorus containing acid can be useful in minimizing IEL in treated polycarbonates.

A. Preparation of the Terpolymer Production Sample Lots

Figure 9:
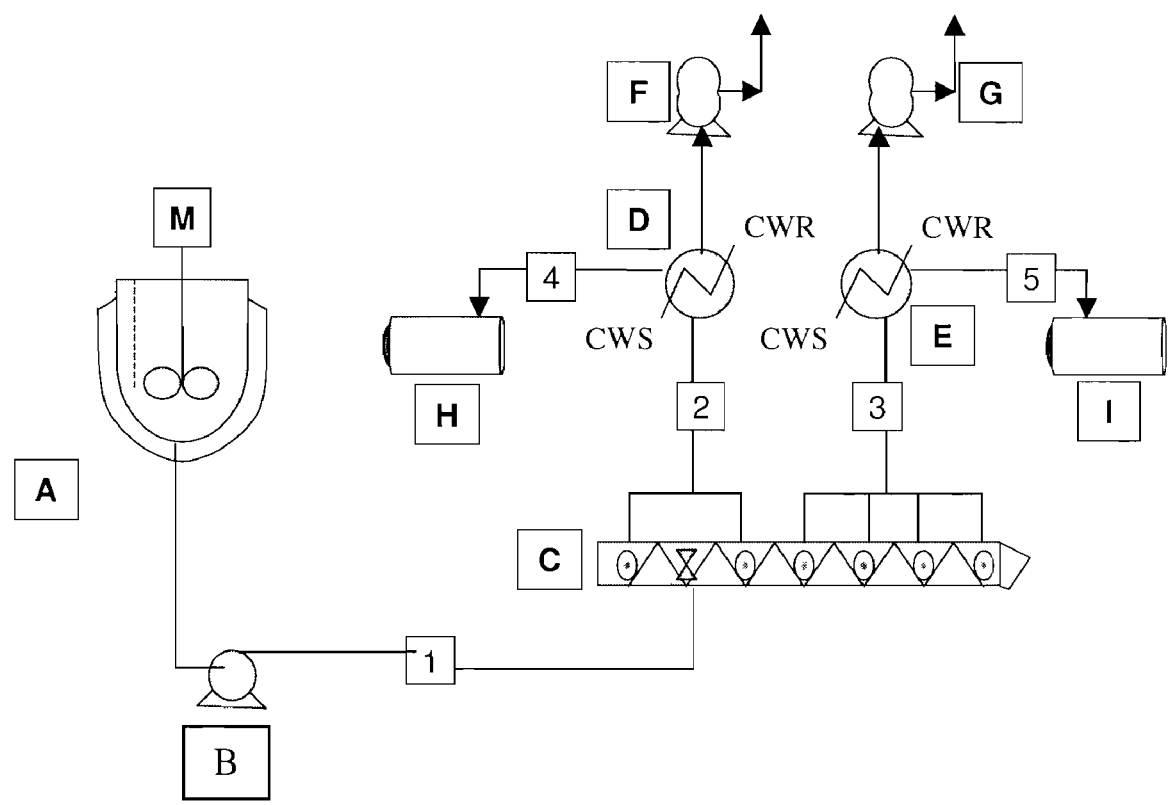
FIG. 9 shows a reactor system used in the example section.

Polymerizations were carried out in the reactor system shown schematically in FIG. 9. In order to minimize variations in the sample properties and experimental results due to run-to-run variations and variations in the quality of raw materials, all of the terpolymer samples in the molding experiments were prepared in one single production run. In this system the oligomerization vessel A is charged at ambient temperature and pressure with solid dihydroxy compound monomers, bisphenol A, hydroquinone, and methyl hydroquinone and solid BMSC. The mol % of monomers in the terpolymers was 33% BPA, 34% hydroquinone, and 33% methyl hydroquinone. The catalysts tetramethyl ammonium hydroxide and sodium hydroxide were next added as an aqueous solution (the tetramethyl ammonium hydroxide at a concentration of 25 uEq/mol diol and the sodium hydroxide at a concentration of 4 uEq/mol BPA in the case of homopolymer and 2 uEq/mol BPA in the case of terpolymer). After this the oligomerization reactor was sealed shut. The system was deoxygenated by briefly evacuating the oligomerization reactor and then introducing nitrogen. This deoxegenation process was repeated three times. The oligomerization reactor was then heated to a temperature of 160° C. After a period of approximately 4 hours, an additional amount of sodium hydroxide was added to the molten oligomers at a concentration of 6 uEq/mol dihydroxy compound.

The molten oligomer was then fed to a ZSK 25 extruder C by means of pump B and feedline 1 (FIG. 9). The ZSK 25 extruder is a 25 mm diameter, twin screw, co-rotating intermeshing extruder having a length to diameter ratio (L/D) of about 59. The oligomer was fed to the extruder at a rate of about 12 to 14 kg/h, and the screw speed was about 300 rpm. The barrels of the extruder were set at 300° C., the die head at 310° C. The ZSK 25 extruder is equipped with a high and low vacuum system to remove the methyl salicylate formed as a byproduct in the polycondensation reaction. The low vacuum system consists of line 2, condenser D, Vacuum pump F and MS holding tank H. The high vacuum system consists of line 3, condenser E, Vacuum pump G and MS holding tank I. The two low vacuum vents are operated at a vacuum level of about 14 to 20 mbar, and the subsequent four high vacuum vents operated at a vacuum level of about 0.5 to 4 mbar. The extruder was operated under conditions of temperature, vacuum, residence time, and mixing intensity sufficient to promote polymerization. It should be noted that the terpolymer product of this single production run was separated into four different production lot samples collected over the approximately first, second, third and fourth quarter of the production run. Each of these four production lot samples was well-mixed by hand in order to give a single homogeneous material. Since the level of I-SC systematically increases with the residence time for constant temperature conditions, the levels of I-SC systematically increases in each of these four sample production lots.

B. Characterization of the S-Terpolymer Production Lot Samples

The molecular weight properties of the polymers were determined by gel permeation chromatographic (GPC) analysis, using polycarbonate molecular weight standards to construct a broad standard calibration curve against which polymer molecular weights were determined. The terpolymer (TP) values were corrected based on their lower average repeat unit mass versus that of BPA homopolymers.

The levels of terminal methyl salicylate carbonate (T-MSC) and reaction byproducts such as internal ester linkages (IEL) in the polymers were measured by means of proton NMR. Deuterated tetrachloroethane (TCE) was used as solvent. All of the sample lots were found to have non-detectable levels of OH end groups.

The color of the pellets was measured using a Xrite Teleflash 130. The instrument allows one to measure pellet color directly, eliminating the need of applying additional processing steps such as molding which can cause the color to change. For the Xrite a standard light source D65 (neutral daylight, 6500 Kelvin) with a 10° observation angle is chosen to generate L*, a*, and b* values. The pellets to be measured are placed in a glass Petri-dish with a diameter of 15 cm and a height of 4 cm. The dish is completely filled with pellets, excess pellets are removed and the surface pellets gently compressed. Next, the filled dish is placed at a fixed distance and angle from the Xrite light source and detector. Upon testing a bright light flashes and the reflected light is used by the device to determine the color L*, a*, and b* values for the sample. Each sample is measured three times in 3 different dish positions whereby the dish is rotated between each position.

C. Compounding of the S-Terpolymer Production Sample Lots

After homogenization, each of the four terpolymer production lots was further divided into three smaller sample lots. One of these smaller sample lots was left untreated before it was molded, and a second of these smaller sample lots was treated as a compounding "blank" sample by compounding it together with 5 mass % of commercially available polycarbonate sold under the trade name LEXAN® 101 prior to molding. The third of these smaller sample lots was then compounded together with LEXAN® 101 polycarbonate containing sufficient $H_3PO_3$ to result in a 20 ppm level of $H_3PO_3$ in the final compounded terpolymer that was then subsequently molded.

D. Compounding and Molding of the S-Terpolymer Production Sample Lots

Half of each of the three smaller sample lots of each of the four terpolymer production lot samples was molded using two different molding processes, one a mild molding process (A) and the other a harsh molding process (B) in terms of residence time and temperature. Therefore a total of twelve different resin samples types were molded in two molding processes to yield a total of 24 different types of molded S-terpolymer samples. The terpolymer (TP) polycarbonate pellets were dried before molding for 3 hours at 105° C. Different molding conditions were applied for the terpolymer samples, but always the same molding machine, an Engel 45T, and mold, an insert mold yielding a plaque of 60×60×2.5 mm, were used. The two molding conditions are given below in Table 10.

TABLE 10

Two molding conditions used in the molding of terpolymer production lot samples
Molding of S-Terpolymers on Engel 45T

| Condition | UOM | molding process A | molding process B |
|---|---|---|---|
| Predry temp | ° C. | 105 | 105 |
| Predry time | hr | 3 | 3 |
| Temp. Hopper | ° C. | 40 | 40 |
| Temp. zone 1 | ° C. | 280 | 320 |
| Temp. Zone 2 | ° C. | 290 | 330 |
| Temp. Zone 3 | ° C. | 300 | 340 |
| Temp. Nozzle | ° C. | 295 | 335 |
| Temp. Mold | ° C. | 90 | 100 |
| Holding time | sec | 10 | 10 |
| Cooling time | sec | 20 | 128 |
| Cycletime | sec | 36 | 144 |
| Residence time | sec | 180 | 720 |

E. Characterization of the Color Properties of Molded Terpolymer Production Sample Lots The color of the molded 2.5 mm thick TP plaques was measured in the transmission mode using a Gretag-MacBeth 7000A spectrometer according to the CIE laboratory standard. A D65 light source was used with a 10° observation angle. The IEL levels of the molded plaques were measured as described previously for the pellet samples. It should be noted that the color values of the pellets and plaques are not directly comparable with each other due to the differences in the methods by which they are measured and thus the nature of the interaction between the light and the sample, for example reflectance of the pellets versus transmission through the plaques.

Figure 5:
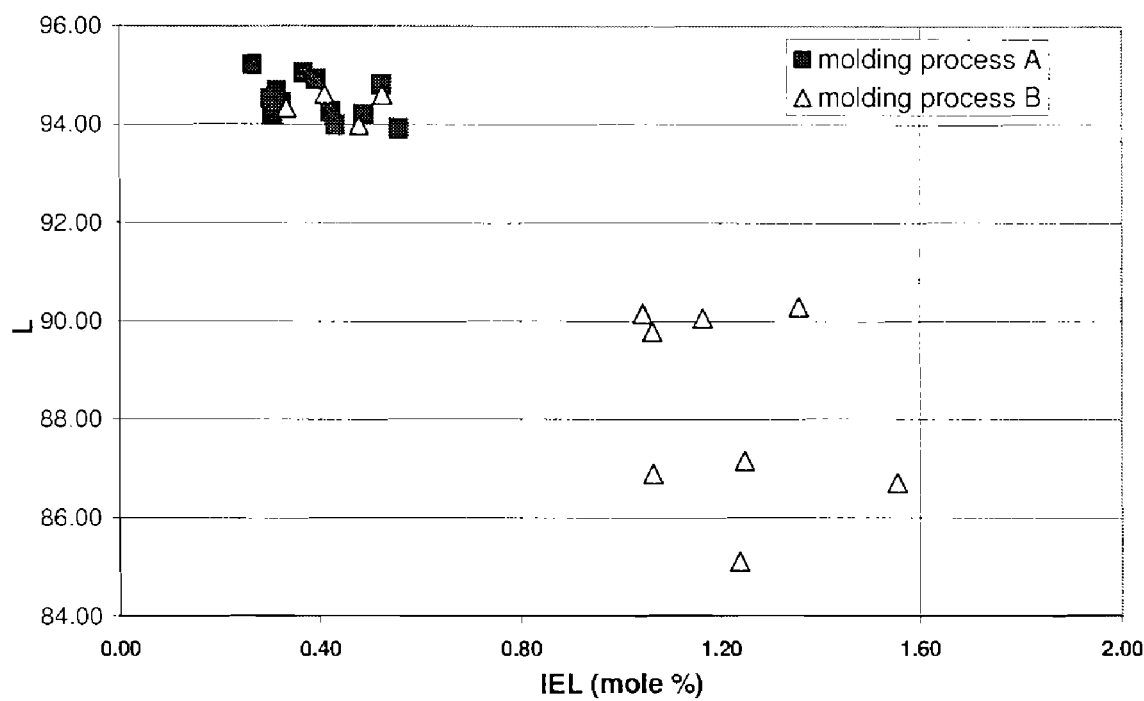
Figure 6:
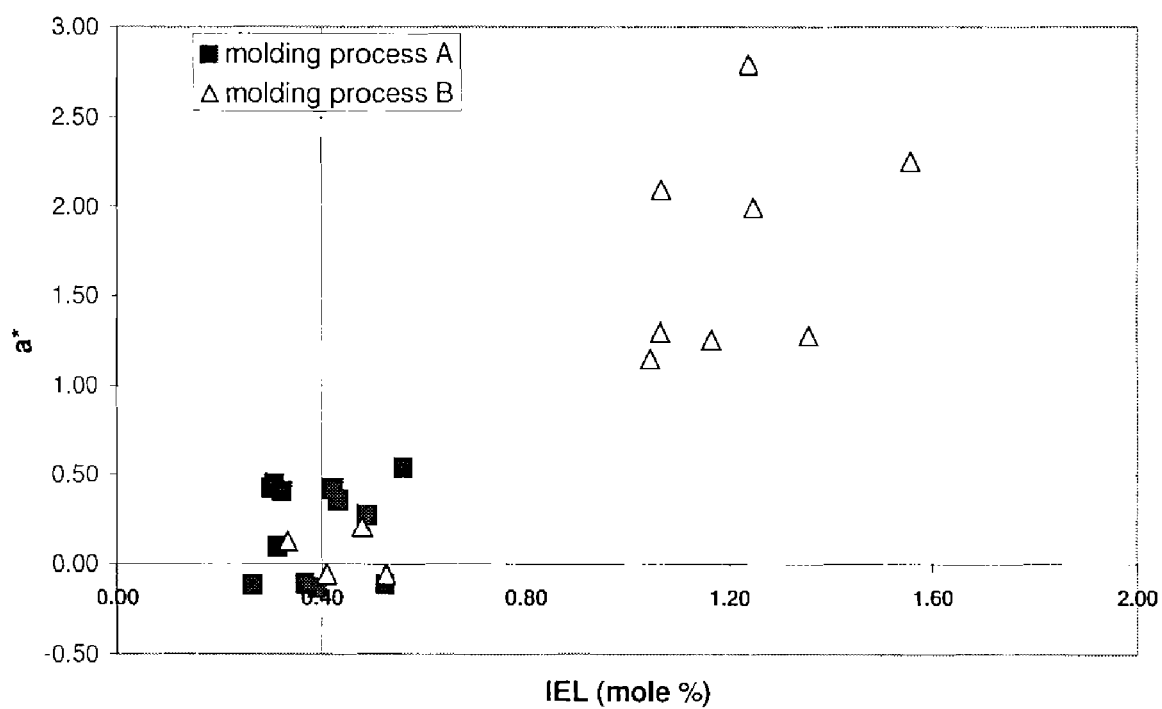
Figure 7:
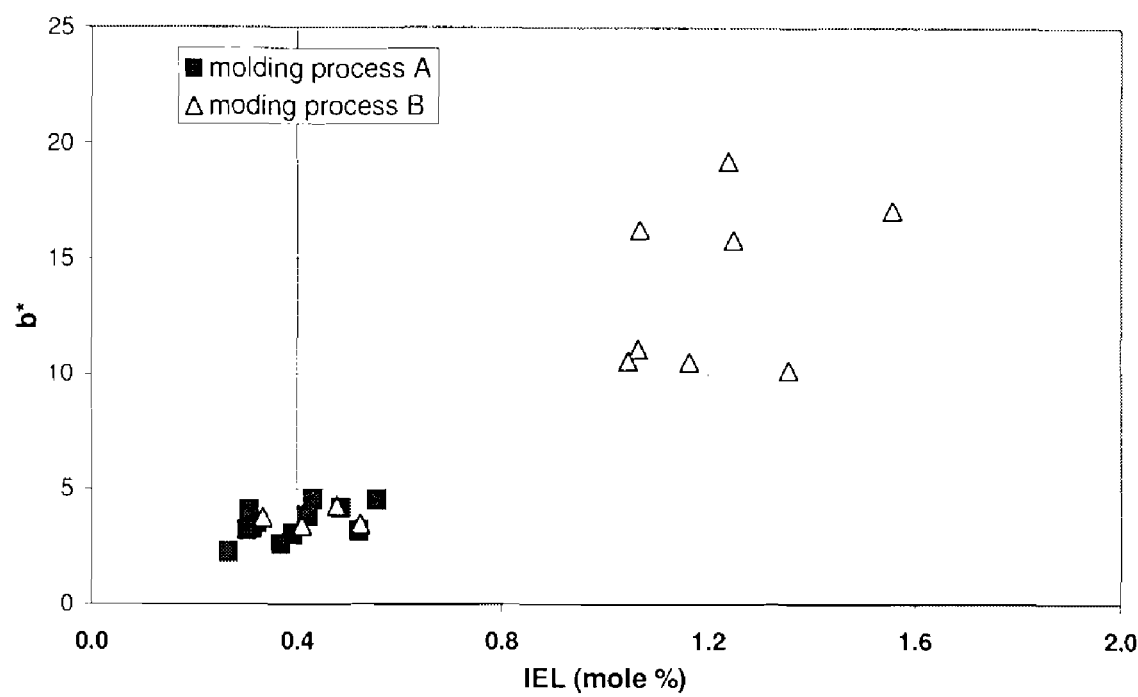

The color parameters 1, a, and b of the various molded TP plaques obtained using molding conditions B are given in Tables 11 and 12 and graphically in FIGS. 5, 6, and 7.

TABLE 11

Properties and Direct Molding of Terpolymer Production Lot Samples

| Terpolymer Production Lot | Terpolymer Pellets | | | | | | | Directly Molded Plaques (molding process A) | | | | Directly Molded Plaques (molding process B) | | | |
|---|---|---|---|---|---|---|---|---|---|---|---|---|---|---|---|
| | Mw (PC) | Mn (PC) | Pd | IEL (mole %) | L | a | b | IEL (mole %) | L | a | b | IEL (mole %) | L | a | b |
| 1 | 25420 | 10988 | 2.31 | 0.297 | 86.49 | 3.38 | 13.7 | 0.30 | 94.53 | 0.43 | 3.21 | 1.36 | 90.29 | 1.28 | 10.17 |
| 2 | 27244 | 11516 | 2.37 | 0.373 | 79.73 | 3.46 | 14.88 | 0.32 | 94.45 | 0.41 | 3.50 | 1.16 | 90.07 | 1.26 | 10.52 |
| 3 | 28681 | 12131 | 2.36 | 0.453 | 79.34 | 3.78 | 15.81 | 0.42 | 94.26 | 0.42 | 3.85 | 1.06 | 89.79 | 1.30 | 11.09 |
| 4 | 29551 | 12344 | 2.39 | 0.504 | 78.68 | 4.18 | 16.51 | 0.56 | 93.92 | 0.54 | 4.55 | 1.04 | 90.16 | 1.15 | 10.56 |

TABLE 12

Properties of Compounded & Molded Terpolymer Production Lot Samples: Blanks and Acid-Containing Samples

| Terpolymer Production Lot | Samples Compounded with PC 105 (Blank) | | | | | | | | Samples Compounded with 20 ppm H3PO3 | | | | | | | |
|---|---|---|---|---|---|---|---|---|---|---|---|---|---|---|---|---|
| | Molded Plaques (molding process A) | | | | Molded Plaques (molding process B) | | | | Molded Plaques (molding process A) | | | | Molded Plaques (molding process B) | | | |
| | IEL (mole %) | L | a | b | IEL (mole %) | L | a | b | IEL (mole %) | L | a | b | IEL (mole %) | L | a | b |
| 1 | 0.27 | 80.97 | 1.79 | 16.68 | 1.56 | 86.71 | 2.26 | 17.14 | 0.27 | 95.22 | −0.11 | 2.26 | 0.33 | 94.34 | 0.13 | 3.75 |
| 2 | 0.35 | 80.26 | 2.14 | 17.55 | 1.07 | 86.91 | 2.10 | 16.27 | 0.37 | 95.05 | −0.11 | 2.60 | 0.48 | 93.98 | 0.21 | 4.28 |
| 3 | 0.40 | 78.32 | 2.77 | 18.97 | 1.24 | 85.12 | 2.79 | 19.23 | 0.39 | 94.91 | −0.13 | 3.04 | 0.41 | 94.61 | −0.05 | 3.40 |
| 4 | 0.51 | 78.25 | 3.08 | 19.3 | 1.25 | 87.16 | 2.00 | 15.78 | 0.52 | 94.81 | −0.11 | 3.21 | 0.52 | 94.61 | −0.06 | 3.48 |

F. Characterization of the Hydrolytic Stability Properties of Molded Terpolymer Production Sample Lots For hydrolytic stability testing, the terpolymer plaques were treated in a steam autoclave at 120° C. for 200 hr. Molecular weights (Mw) were measured as described earlier via GPC for the TP plaque samples both before (pre-Mw) and after (post-Mw) the treatment in the autoclave. The percent decrease in molecular weight was taken as a measure of the relative hydrolytic stabilities of the plaque samples:

$$\% \, Mw \text{ Decrease} = 100 \times (\text{post-}Mw - \text{pre-}Mw)/\text{pre-}Mw. \quad (1)$$

The larger the percent decrease in molecular weight, the less hydrolytically stable the plaque was.

The percent molecular weight decrease of the 24 various molded plaque samples is given below in Table 13, along with the Internal Ester Linkage (IEL) concentration of the same molded plaques on a mol % basis measured prior to the testing of hydrolytic stability. The same data is presented graphically below in FIG. 5.

TABLE 13

Hydrolytic Stability of Molded Terpolymer Production Lot Samples

| Terpolymer Production Lot | Compounding | Molding Process | IEL (mole %) | Molecular Weight Decrease (%) |
|---|---|---|---|---|
| 1 | None | A | 0.30 | −16.62 |
|   |      | B | 1.36 | −31.56 |
| 1 | blank | A | 0.27 | −16.15 |
|   |       | B | 1.56 | −24.18 |
| 1 | 20 ppm H3PO3 | A | 0.27 | −7.30 |
|   |              | B | 0.33 | −6.82 |
| 2 | None | A | 0.32 | −16.01 |
|   |      | B | 1.16 | −22.13 |
| 2 | blank | A | 0.35 | −10.86 |
|   |       | B | 1.07 | −19.12 |
| 2 | 20 ppm H3PO3 | A | 0.37 | −10.30 |
|   |              | B | 0.48 | −5.34 |
| 3 | None | A | 0.42 | −16.64 |
|   |      | B | 1.06 | −20.73 |
| 3 | blank | A | 0.40 | −14.27 |
|   |       | B | 1.24 | −17.50 |
| 3 | 20 ppm H3PO3 | A | 0.39 | −13.11 |
|   |              | B | 0.41 | −13.57 |
| 4 | None | A | 0.56 | −16.09 |
|   |      | B | 1.04 | −20.30 |
| 4 | blank | A | 0.51 | −11.99 |
|   |       | B | 1.25 | −18.58 |
| 4 | 20 ppm H3PO3 | A | 0.52 | −14.57 |
|   |              | B | 0.52 | −15.15 |

G. Discussion/Conclusion

From Table 11 it can be seen that the pellets from the terpolymer production lots having lower IEL levels also have less color. For example, the L value decreases and the a and b values increase systematically from lots 1 to 4.

It can also be seen from the data in Tables 11 and 12 that terpolymer production lot pellets having lower IEL levels generally yield molded articles having lower levels of IEL for the same compounding and molding conditions. This can be seen especially clearly by comparing the IEL levels of the plaques molded under the same conditions from the pellets in terpolymel production lot 1 versus lot 4. The only exception to this behavior is for the compounding blank samples molded using the harsh molding conditions (molding process B). Therefore it can be concluded that it is generally beneficial to use polymer resins having lower IEL values in molding processes.

It can also be seen from the data in Tables 11 and 12 milder molding conditions (e.g. lower molder temperature and shorter residence time) are favorable in causing less additional IEL formation during the molding process. This benefit in using milder molding conditions can be seen by comparing the IEL levels of the same terpolymer production lot molded by the milder process A versus the harsher process B. Therefore it can be concluded that it is generally beneficial to use milder conditions in the molding of polymer resins.

It can also be seen from the data in Tables 11 and 12 that the use of $H_3PO_3$ as a stabilizing additive during the compounding process results in less IEL formation during the subsequent molding process. The beneficial stabilizing effect of this phosphorus-containing compound appears to be most pronounced for the samples molded in the harsher molding process B. Therefore it can be concluded that the use of appropriate phosphorus-containing compounds is beneficial in minimizing further IEL formation during molding. It can also be seen from Tables 11 and 12 that the use of appropriate phosphorus-containing compounds is also directly beneficial in minimizing color formation during the molding of a particular terpolymer production lot material by either the milder or harsher molding conditions, e.g. A or B. The data in Table 13 indicates that these phosphorus-containing compounds are also beneficial in prevention of or reduction in the hydroloytic stability of plaques molded from a particular terpolymer production lot under a particular set of molding conditions.

Comparing the directly molded samples versus the molded compound blank samples prepared by the milder molding process A indicates that the incorporation of an additional compounding step has only a minor effect increasing the IEL level of the molded plaque. Although there is some scatter, the difference between the directly molded samples and the compounded blank samples appears greater in the harsher molding process B. Therefore there may be some benefit in reducing the IEL content and color of molded parts by minimizing or limiting any unnecessary compounding steps.

The L values of the molded plaques tend to generally decrease with increases in the IEL of the starting pellets (terpolymer production lot pellets) for the same compounding and molding process conditions. Again, this behavior can be seen most clearly by comparing the L values of the plaques molded under the same conditions from the pellets in terpolymer production lots 1 and 4. In this comparison, the only exception is again the compounding blank samples molded using the harsh molding conditions (molding process B). From FIG. 5, it can be seen that this decrease in L value of the molded plaques strongly correlates with the IEL content of the molded plaque. The samples having low IEL values all have high values of L closely clustered together. The samples having higher IEL values (e.g. more than about 0.4 mol %), all have less transparency and reduced L values. Similar conclusions can be drawn with respect to the a and b values of the molded plaques and their correlation with the IEL levels of the molded plaques.

Figure 8:
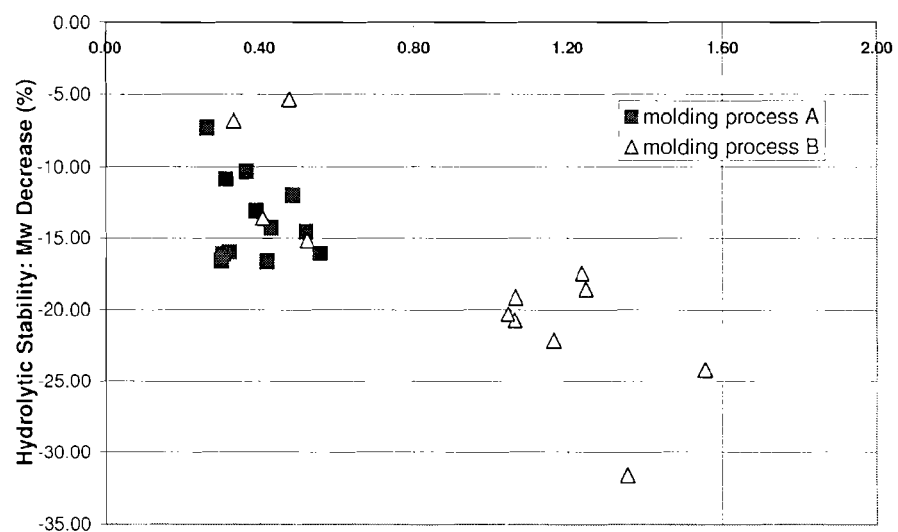

Examining the data in Table 13 and shown graphically in FIG. 8 indicates that the hydrolytic stability of molded plaques generally decreases as the IEL of the starting pellets (terpolymer production lots) increases for constant compounding and molding conditions. As discussed earlier, the use of appropriate phosphorus-containing compounds is quite effective in minimizing further IEL formation during molding and the accompanying reduction in hydrolytic stability.

The invention claimed is:

1. A method for preparing a molded article comprising the steps of:
   (a) obtaining a polycarbonate resin, said polycarbonate having been made by a transesterification reaction using an ester-substituted diaryl carbonate such that the polycarbonate is susceptible to the formation of internal ester linkages (IEL) having the structure

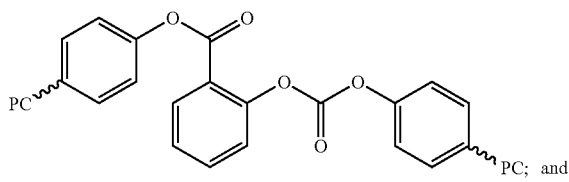

(b) molding the polycarbonate resin to form the article, wherein the polycarbonate resin, the molding conditions or both are selected to control the amount of IEL formed during the molding process to a level of less than 0.4 mol %.

2. The method of claim 1, wherein the polycarbonate resin prior to molding is selected such that it has an IEL of less than 0.4 mol %.

3. The method of claim 2, wherein the polycarbonate resin is prepared by a reverse ratio method.

4. The method of claim 3, wherein the polycarbonate resin is prepared by a method that includes the addition of an end-capping reagent.

5. The method of claim 2, wherein the polycarbonate resin is prepared by a method that includes the addition of an end-capping reagent.

6. The method of claim 2, wherein the polycarbonate resin is prepared using an ester-substituted diaryl carbonate having a triester carbonate contaminant level of less than 0.3 mol %.

7. The method of claim 6, wherein the triester carbonate contaminant level is less than 0.27 mol %.

8. The method of claim 7, wherein the triester carbonate contaminant level is less than 0.18 mol %.

9. The method of claim 2, wherein a phosphorous containing compound is added to polycarbonate resin prior to or during molding in an amount effective to control the formation of IEL.

10. The method of claim 1, wherein the polycarbonate resin is prepared by a reverse ratio method.

11. The method of claim 10, wherein the polycarbonate resin is prepared by a method that includes the addition of an end-capping reagent.

12. The method of claim 10, wherein the polycarbonate resin is prepared using an ester-substituted diaryl carbonate having a triester carbonate contaminant level of less than 0.3 mol %.

13. The method of claim 12, wherein the triester carbonate contaminant level is less than 0.27 mol %.

14. The method of claim 13, wherein the triester carbonate contaminant level is less than 0.18 mol %.

15. The method of claim 10, wherein a phosphorous containing compound is added to polycarbonate resin prior to or during molding in an amount effective to control the formation of IEL.

16. The method of claim 1, wherein the polycarbonate resin is prepared by a method that includes the addition of an end-capping reagent.

17. The method of claim 16, wherein the polycarbonate resin is prepared using an ester-substituted diaryl carbonate having a triester carbonate contaminant level of less than 0.3 mol %.

18. The method of claim 17, wherein the triester carbonate contaminant level is less than 0.27 mol %.

19. The method of claim 18, wherein the triester carbonate contaminant level is less than 0.18 mol %.

20. The method of claim 16, wherein a phosphorous containing compound is added to polycarbonate resin prior to or during molding in an amount effective to control the formation of IEL.

21. The method of claim 1, wherein the polycarbonate resin is prepared using an ester-substituted diaryl carbonate having a triester carbonate contaminant level of less than 0.3 mol %.

22. The method of claim 21, wherein the triester carbonate contaminant level is less than 0.27 mol %.

23. The method of claim 22, wherein the triester carbonate contaminant level is less than 0.18 mol %.

24. The method of claim 23, wherein a phosphorous containing compound is added to polycarbonate resin prior to or during molding in an amount effective to control the formation of IEL.

25. The method of claim 1, wherein a phosphorous containing compound is added to polycarbonate resin prior to or during molding in an amount effective to control the formation of IEL.

26. A molded article comprising a polycarbonate having internal ester linkages derived from an ester-substituted diaryl carbonate, wherein the internal ester linkages have the structure

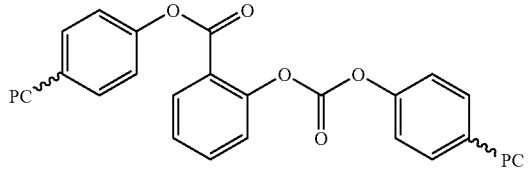

and are present in an amount less than 0.4 mol % and the polycarbonate has an L value of greater than 85.

* * * * *